United States Patent
Nyström et al.

(10) Patent No.: US 11,530,820 B2
(45) Date of Patent: *Dec. 20, 2022

(54) HEAT PANEL, A HEATING SYSTEM AND A METHOD FOR INSTALLING SUCH A HEATING SYSTEM

(71) Applicant: Heat Click Company AB, Nyköping (SE)

(72) Inventors: Taisto Kalevi Nyström, Nyköping (SE); Håkan Johan Löfholm, Huddinge (SE)

(73) Assignee: Heat Click Company AB, Nyköping (SE)

( * ) Notice: Subject to any disclaimer, the term of this patent is extended or adjusted under 35 U.S.C. 154(b) by 291 days.

This patent is subject to a terminal disclaimer.

(21) Appl. No.: 16/615,449

(22) PCT Filed: May 18, 2018

(86) PCT No.: PCT/SE2018/050514
§ 371 (c)(1),
(2) Date: Nov. 21, 2019

(87) PCT Pub. No.: WO2018/217153
PCT Pub. Date: Nov. 29, 2018

(65) Prior Publication Data
US 2020/0173665 A1     Jun. 4, 2020

(30) Foreign Application Priority Data
May 22, 2017   (SE) .................................... 1750632-0

(51) Int. Cl.
*F24D 13/02* (2006.01)
*H05B 3/06* (2006.01)
(Continued)

(52) U.S. Cl.
CPC ...... *F24D 13/024* (2013.01); *E04F 15/02038* (2013.01); *E04F 15/107* (2013.01);
(Continued)

(58) Field of Classification Search
None
See application file for complete search history.

(56) References Cited

U.S. PATENT DOCUMENTS

| 5,004,895 A | 4/1991 | Nishino et al. |
| 7,432,472 B2 | 10/2008 | Åkerlind |

(Continued)

FOREIGN PATENT DOCUMENTS

| CN | 1469958 A | 1/2004 |
| CN | 102997327 A | 3/2013 |

(Continued)

*Primary Examiner* — Joseph M. Pelham
(74) *Attorney, Agent, or Firm* — Blank Rome LLP

(57) ABSTRACT

A panel comprising a heat providing layer is presented. The panel includes panel coupling means arranged for coupling the panel to adjacent panels. In order to provide heat, longitudinal grooves are arranged in the panel along the whole length of the panel. Electrical end connectors are arranged in the longitudinal grooves to protrude from at least one end side of the panel. The electrical end connectors are arranged for being electrically connected to the heat providing layer, and for being electrically connectable to at least one corresponding end connector of at least one adjacent panel, and for being at least partly resilient, thereby providing a connecting force $F_{con}$ being essentially perpendicular to the at least one of the first and the second end sides when the panel is coupled to at least one adjacent panel, and being directed towards at least one corresponding end connector of the at least one adjacent panel.

15 Claims, 13 Drawing Sheets

(51) Int. Cl.
*H05B 3/26* (2006.01)
*E04F 15/02* (2006.01)
*E04F 15/10* (2006.01)

(52) U.S. Cl.
CPC ........ *H05B 3/06* (2013.01); *E04F 2201/0176* (2013.01); *E04F 2290/023* (2013.01); *H05B 2203/016* (2013.01); *H05B 2203/026* (2013.01)

(56) References Cited

U.S. PATENT DOCUMENTS

| | | | |
|---|---|---|---|
| 8,835,809 B2* | 9/2014 | Dohring | F24D 13/024 |
| | | | 219/213 |
| 9,353,533 B2 | 5/2016 | Carrubba | |
| 9,394,698 B2 | 7/2016 | Carrubba | |
| 10,119,709 B2* | 11/2018 | Döhring | H05B 3/20 |
| 10,760,283 B2* | 9/2020 | Carrubba | E04F 15/02033 |
| 2006/0137280 A1* | 6/2006 | Bartnes | E04F 15/02 |
| | | | 52/582.2 |
| 2006/0289144 A1 | 12/2006 | Akerlind | |
| 2008/0210679 A1 | 9/2008 | Raidt et al. | |
| 2011/0272392 A1 | 11/2011 | Dohring et al. | |
| 2012/0168427 A1* | 7/2012 | Chang | F24D 13/02 |
| | | | 219/528 |
| 2012/0292306 A1* | 11/2012 | Lai | F24D 13/024 |
| | | | 219/520 |
| 2014/0001170 A1* | 1/2014 | Son | H05B 3/02 |
| | | | 219/209 |
| 2014/0069605 A1* | 3/2014 | Sullivan | B21D 47/00 |
| | | | 165/56 |
| 2018/0208512 A1* | 7/2018 | Da Silva Sousa | C04B 41/009 |
| 2020/0103124 A1* | 4/2020 | Nyström | F24D 13/024 |
| 2022/0010974 A1* | 1/2022 | Lofholm | E04F 15/02038 |

FOREIGN PATENT DOCUMENTS

| | | | | |
|---|---|---|---|---|
| CN | 103075757 A | | 5/2013 | |
| CN | 103180533 A | | 6/2013 | |
| CN | 103267315 A | | 8/2013 | |
| CN | 105143573 A | | 12/2015 | |
| CN | 205348658 U | | 6/2016 | |
| CN | 205712926 U | | 11/2016 | |
| CN | 205742860 U | | 11/2016 | |
| CN | 205918048 U | | 2/2017 | |
| EP | 0 297 370 A2 | | 1/1989 | |
| EP | 1 884 716 A2 | | 2/2008 | |
| EP | 2 116 778 A1 | | 11/2009 | |
| FR | 2 698 432 A1 | | 5/1994 | |
| JP | 51-115744 U | | 9/1976 | |
| JP | H-08218608 A | | 8/1996 | |
| JP | 2000-179877 A | | 6/2000 | |
| JP | 2006-145066 A | | 6/2006 | |
| JP | 2008-51470 A | | 3/2008 | |
| JP | 2016-85027 A | | 5/2016 | |
| JP | 3218862 U | * | 11/2018 | |
| KR | 20090102776 A | * | 9/2009 | |
| KR | 10-2015-0133464 A | | 11/2015 | |
| SE | 1400611 A1 | | 7/2016 | |
| WO | WO 2004/048854 A1 | | 6/2004 | |
| WO | WO 2004/099530 A1 | | 11/2004 | |
| WO | WO-2007115559 A2 | * | 10/2007 | ........ F24D 13/022 |
| WO | WO 2017/018900 A1 | | 2/2017 | |

* cited by examiner

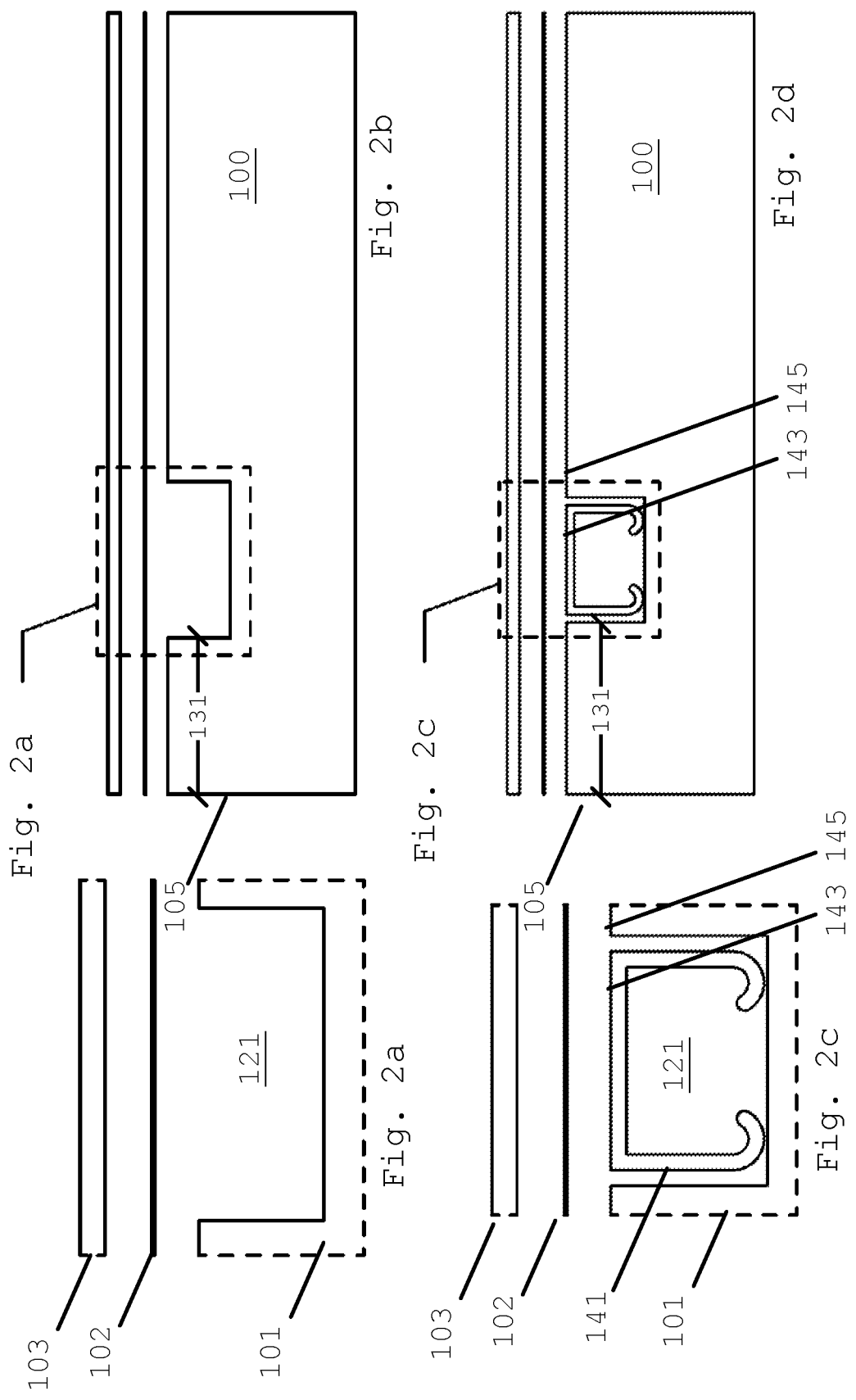

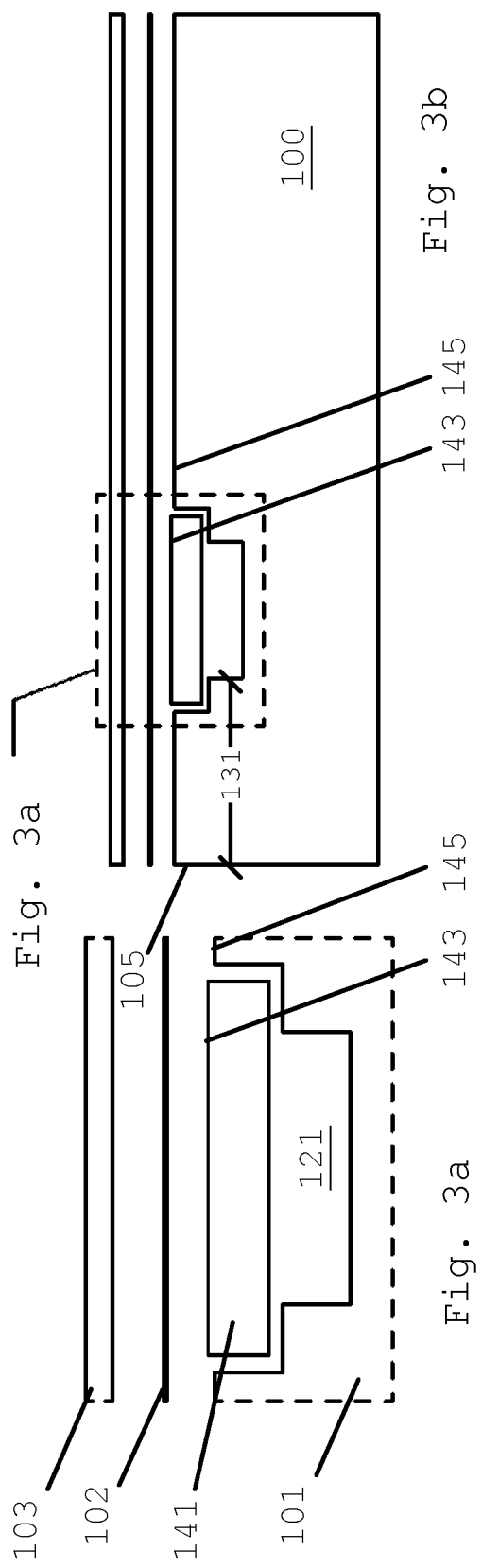
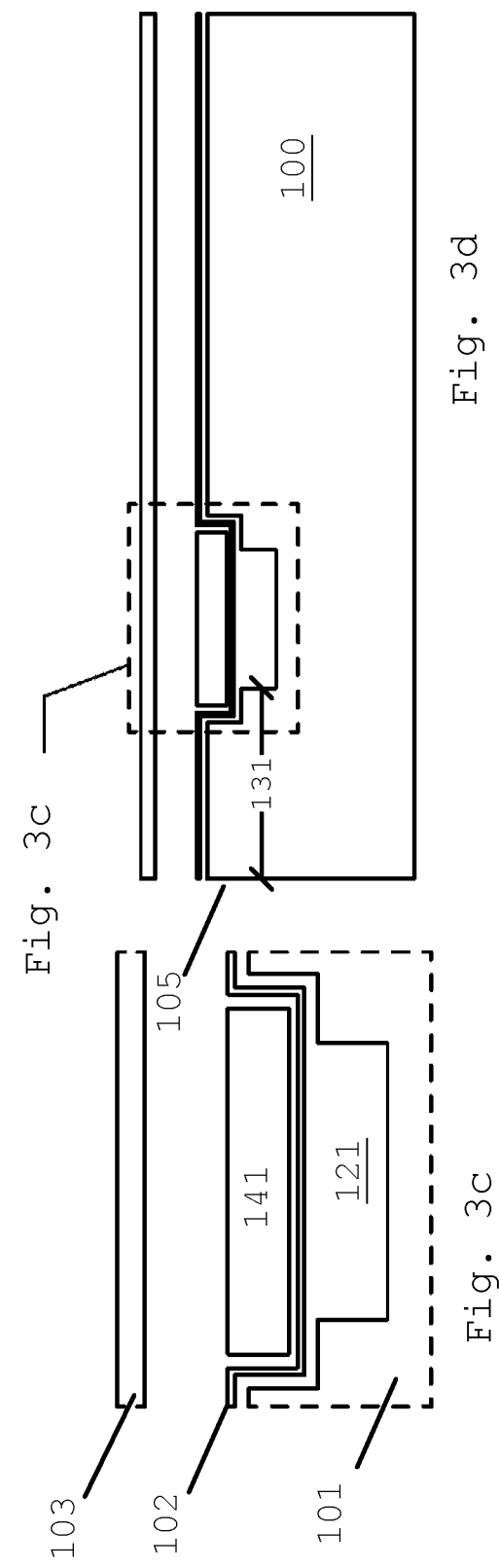

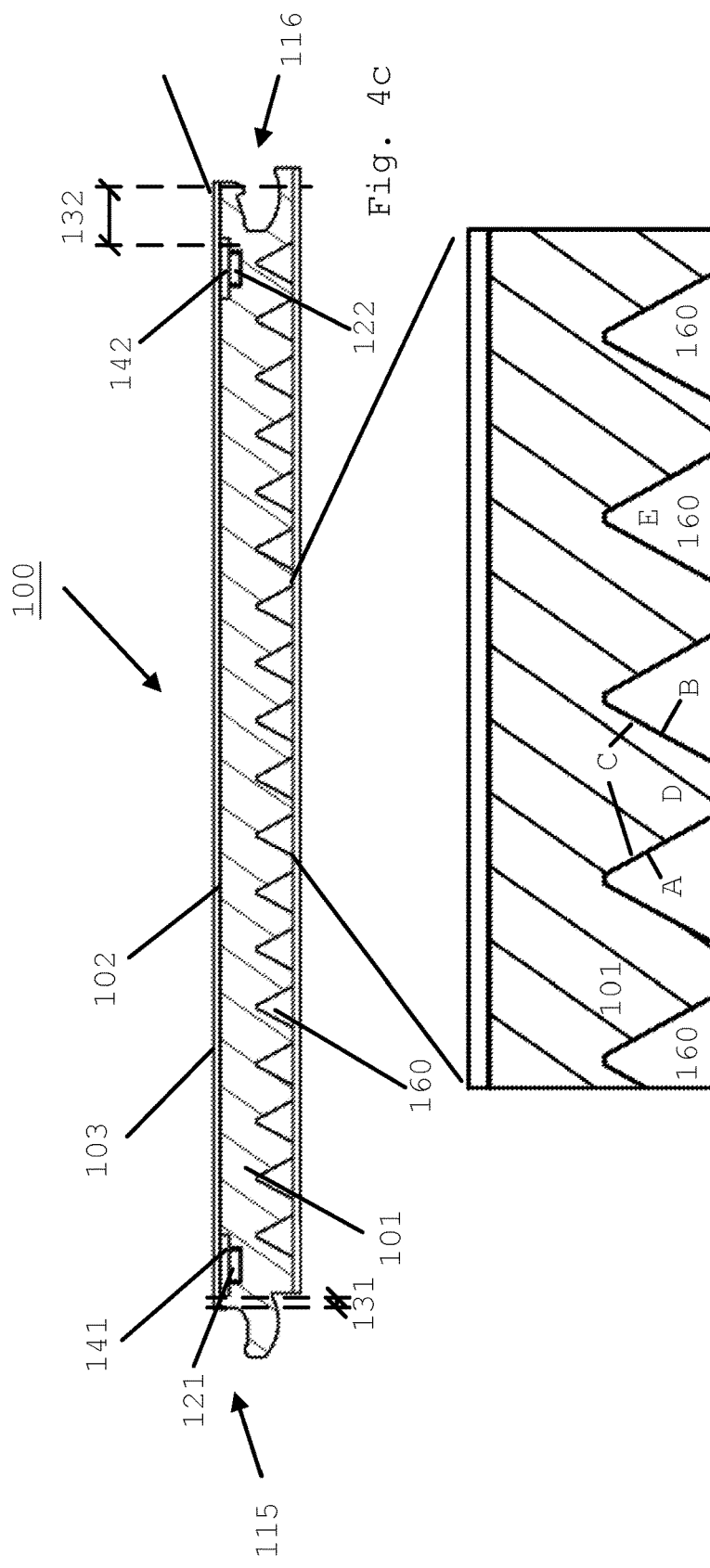
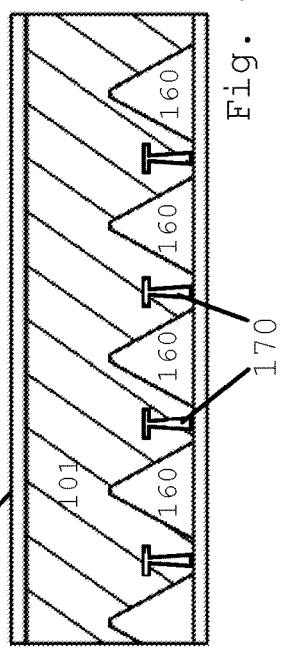

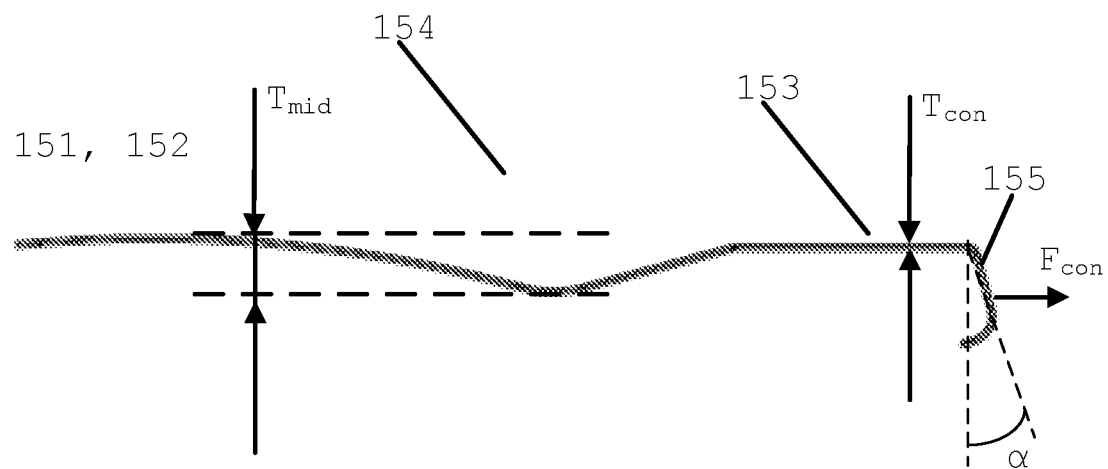
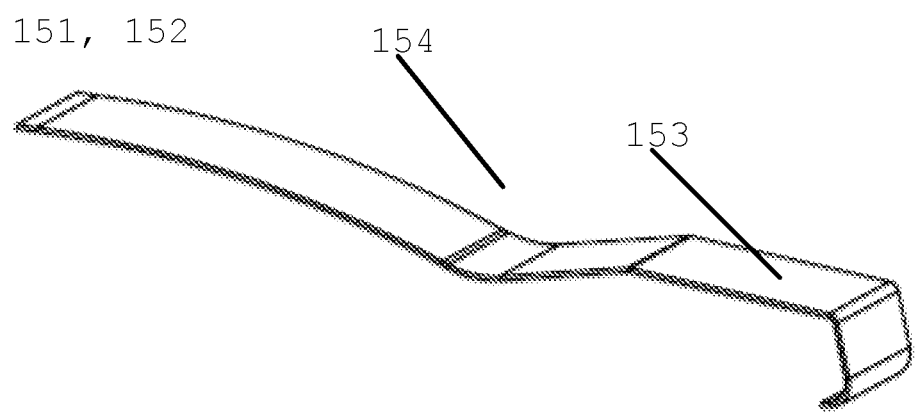
Fig. 5c

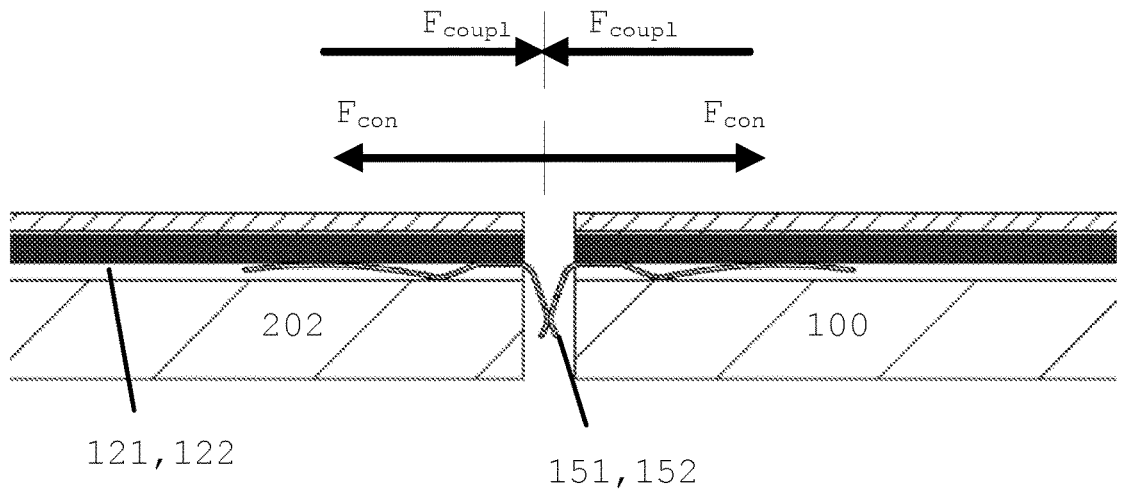
Fig. 10a
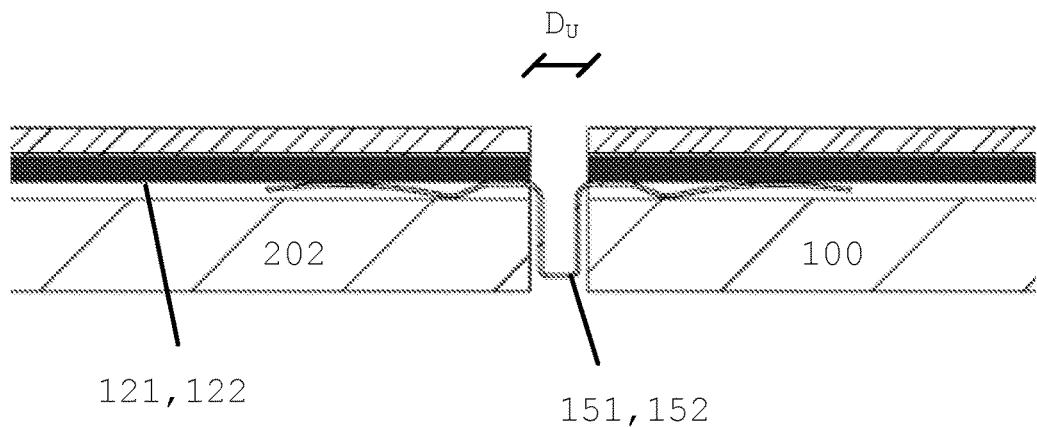
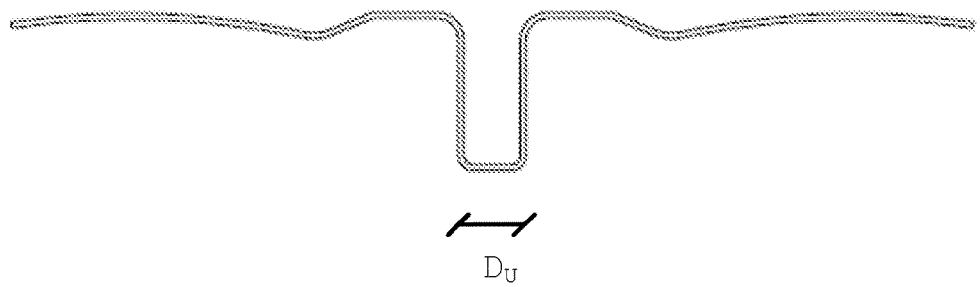
Fig. 10b

HEAT PANEL, A HEATING SYSTEM AND A METHOD FOR INSTALLING SUCH A HEATING SYSTEM

FIELD OF INVENTION

The present invention relates to a panel. The present invention also relates to a heating system. The present invention also relates to a method for installing a heating system.

BACKGROUND OF INVENTION

The following background information is a description of the background of the present invention, which thus not necessarily has to be a description of prior art.

One of our times big challenges is to reduce the overall energy consumption in the world. In many parts of the world, houses, apartments, offices, shops, factories and/or other public or non-public spaces, need to be heated in order to provide an acceptable environment for people spending time in these spaces. Such heating thus needs to provide a comfortable temperature at the same time as the energy consumption should be kept at a minimum.

Underfloor heating may be used for reducing the energy consumption at the same time as an acceptable temperature/environment is provided. It is nowadays common to install underfloor heating using warm water or electricity as a heat source when stone and/or ceramic tiles are used for covering the floor. Also, underfloor heating may be used when wooden floors, such as e.g. parquet flooring, are used for covering the floors.

Traditionally, the heat used for providing the underfloor heating has been created by warm water flowing in pipes/tubes under the floor boards and/or by electricity flowing through resistance in sheet materials arranged under the floor boards. Such a known solution is described in US2008/0210679, in which a mat/sheet "denoted heating device 1" in the document is arranged under a "floor covering 12", i.e. under the actual floor boards. These pipes/tubes and/or sheet materials are thus arranged underneath the wooden floor, or underneath the stone and/or ceramic tiles. These traditional solutions have a disadvantage in that they are not very efficient in providing the heat into the space where it is actually needed, i.e. into the space above the wooden floor, and/or above the stone and/or ceramic tiles. This is due to the fact that the heat is created underneath the wooden floor, or underneath the stone and/or ceramic tiles, and thus needs to be transported through the entire wooden floor, and/or through the entire stone and/or ceramic tiles to reach the space where the e.g. people are to be present, i.e. to reach the space which should be heated. Also, a large part of the created heat is transported in the opposite direction, i.e. away from the wooden floor, or the stone and/or ceramic tiles, which also means away from the space which should be heated. Thus, a lot of the created heat is lost in such traditional heating systems, wherefore the heating system is inefficient and wastes energy.

In a prior art solution shown in US20060289144, a flooring board is instead provided with an embedded heating foil within the board, which is arranged for creating heat when being supplied with electrical energy. Hereby, the created heat is much more efficiently provided to the space in which it is needed, since the heat is created within the actual flooring board, instead of underneath it.

SUMMARY OF INVENTION

The flooring board shown in US20060289144 has, however, a number of problems related to the power supply to the flooring boards. The flooring board has electrical connecting means arranged on the grooves and tongues of the quick coupling joints being used for mechanically coupling the flooring board together with other flooring boards. Since the electrical connecting means are arranged on the grooves and tongues of the joint, the electrical connecting means will also experience small movements when pressure is applied on the flooring boards. The parts of the joints, i.e. the grooves and the tongues of the joints, move slightly every time for example a person walks on the flooring boards. Hereby, the electrical connecting means in US20060289144 will become worn out after some use. Also, even a lost contact may result from the wear of the electrical connecting means, whereby the heating function is lost. Also, a short circuit may be caused by the wear of the electrical connecting means, which may be hazardous due to e.g. a risk of fire. These possible problems are of course very unfortunate, especially for a floor having a long expected life time. Such a floor may have to be exchanged after a considerably shorter time than expected due to a malfunctioning heating function of the floor.

It is therefore an object of the present invention to provide a panel, a heating system, and a method that solve at least some of the above stated problems and/or disadvantages.

The object is achieved by the panel according to the present invention.

The panel includes:

a base layer;

a heat providing layer attached to the base layer, the heat being created by electric energy;

a covering layer, attached to the heat providing layer, which may have a visible surface;

first and second opposite longitudinal sides;

first and second opposite end sides; and panel coupling means arranged for coupling the panel to adjacent panels;

at least first and second longitudinal grooves arranged in the base layer from the first end side to the second end side and facing the heat providing layer, the at least first and second longitudinal grooves being arranged in parallel with, and having at least first and second distances to, the first and second longitudinal sides, respectively; and at least one first and at least one second electrical end connectors arranged in the at least first and second longitudinal grooves to protrude from at least one of the first and the second end sides, and arranged for being electrically connected to the heat providing layer, and for being electrically connectable to at least one corresponding end connector of at least one adjacent panel, and for being at least partly resilient, thereby providing a connecting force $F_{con}$ being essentially perpendicular to the at least one of the first and the second end sides when the panel is coupled to at least one adjacent panel, the connecting force $F_{con}$ being directed towards at least one corresponding end connector of the at least one adjacent panel.

It should be noted that if the panel is mechanically coupled to/arranged between two adjacent panels at its end sides, two connecting forces $F_{con}$ are created, one at each one of the two end sides of the panel. However, if the panel is arranged first or last in a low of panels, i.e. if the panel is only mechanically coupled to one adjacent panel at one of its end sides, only one connecting force $F_{con}$ is created, at the end side facing the adjacent panel. Thus, a at least one connecting force $F_{con}$ being essentially perpendicular to the at least one of the first and the second end sides, respectively, is created when the panel is coupled to at least one adjacent panel.

According to an embodiment of the present invention, the panel also includes at least first and second longitudinal coupling elements arranged in the at least first and second longitudinal grooves from the first end side to the second end side, respectively. Hereby, the at least one first and at least one second electrical end connectors arranged in the at least first and second longitudinal grooves are arranged for being electrically connected to the heat providing layer by means of the at least first and second longitudinal coupling elements.

The above mentioned object is also achieved by the heating system according to the present invetion.

The heating system includes:

at least one panel as described in this document; and an electrical energy providing arrangement, arranged e.g. at a mounting base and/or facing the base layer, adjacent to at least one of the first and the second end sides of the at least one panel for providing the electric energy to the at least one first and at least one second electrical end connectors.

The above mentioned object is also achieved by the method for installing the heating system according to the present invention.

The method includes:

mounting the electrical energy providing arrangement at the mounting base;

mechanically coupling a first panel with at least one second panel by use of the coupling means on the first and second end sides, thereby creating a row of the first panel and the at least one second panel;

electrically connecting the first panel and the at least one second panel by use of the first and second end connectors of the first panel and the at least one second panel; and connecting first and second electrical power supply end connectors of one or more of the first panel and the at least one second panel to the electrical energy providing arrangement.

The panel and heating system according to the present invention provide for an energy efficient and durable heating of essentially all sorts of spaces.

By integrating the heat providing layer into a construction panel, such as e.g. a flooring panel, a wall panel and/or a ceiling panel, it is possible to efficiently, precisely and reliably regulate the indoor climate/temperature in spaces delimited by a floor, walls and a ceiling at least partly including such panels.

The heat providing layer is arranged very close to the space to be heated, since it is located directly under the covering/decorative layer. Hereby, the created heat may be very efficiently transported to the space to be heated when the panel according to the present invention is used. By this efficient heat transportation to the space to be heated, the consumption of electric energy being used for creating the heat is minimized.

The panel according to the present invention is cuttable in the sense of being possible to cut off and still be used for laying floors. This is due to the fact that the locations of the first and second longitudinal grooves are well defined, and due to the fact that the first and second longitudinal grooves run from the first end side to the second end side of the panel, which also results in a well-defined placement of the first and second electrical end connectors and/or the first and second electrical power supply end connectors placed in the first and second grooves, across the whole length of the panel. Hereby, a cut off panel may be laid against another cut off panel, or may be laid against a whole panel, and would still be provided with a reliable supply of electrical energy for generating the heat in the panel. This is possible since the first and second longitudinal grooves run from the first end side to the second end side of the panel, i.e. are arranged in a well-defined location along the whole length of the panel, wherefore the first and second electrical end connectors and/or the first and second electrical power supply end connectors of the panels will fit/match/meet also for cut off panels, such that a connection can easily be made.

The electrical end connectors and/or the electrical power supply end connectors of the panel according to the present invention are separate from the mechanical panel joint coupling, i.e. from the joint coupling mechanically holding panels together. Hereby, the electrical end connectors and/or the electrical power supply end connectors are also protected from the many movements of the parts of the mechanical panel joint, and from the component wear these movement could result in. Hereby, a secure and reliable power supply to the panel is assured. Also, the design of the electrical end connectors according to the present invention simplifies mechanical coupling of panels together, at the same time as a stable electrical coupling is provided.

Also, the at least partly resilient end connectors protruding from at least one of the first and the second end sides of the panel according to the present invention provides for a reliable and secure electrical contact to corresponding end connectors of adjacent panels due to the perpendicular connecting force $F_{con}$ created by the resilience and protrusion of the end connectors. As described more in detail below, the connecting force $F_{con}$ creating the electrical contact is created by a coupling force $F_{coupl}$ caused by the panel coupling means coupling the panel and adjacent panels together. The resilient first and second electrical end connectors thus provide a connecting force $F_{con}$ being essentially perpendicular to the first and second end sides, respectively, when the panel is coupled to an adjacent corresponding panel. Hereby, electrical energy to be used for creating the heat in the heat providing layer reliably reaches each one of coupled panels, and therefore also reaches the heat providing layers of each one of the panels.

The panel according to the present invention may be produced and installed cost efficiently. Since the heat may be created by use of low voltages, such as 4-60 Volts, e.g. approximately 25 Volts or approximately 50 Volts, the panels may even be installed by a layman, i.e. by a non-professional. Thus, by installation of the panels according to the present invention, there may not be a need for an electrician to be present, depending on laws and regulations where the panel is to be installed/used, which dramatically reduces the total cost for an end user, e.g. a house owner. Prior art electrical underfloor heating systems are often driven by much higher voltages, e.g. 230 Volts, which must be installed by a certified electrician.

Some known underfloor heating systems include a lower voltage mat/sheeting creating the heat, which is arranged under the wooden floor or underneath the stone and/or ceramic tiles. One such example is the above mentioned heating device 1 in US2008/0210679, which is arranged under the floor covering 12. This arrangement results in considerable energy losses as described above. Also, this prior art lower voltage mat/sheeting is often difficult to properly install, wherefore a skilled person often must adapt e.g. the size of the mat/sheeting to fit the area to be covered by the floor. This increases the costs for installation of the floors.

The panel according to the present invention, however, already itself includes the heat providing layer, and does thus not need any heat creating mats to be installed underneath it.

As a non-limiting example, a power per floor area in an interval of approximately, 10-40 W/M$_2$, or 20-30 W/m$^2$ may be used for creating the heat. The used power per floor area may be seen as a balance between differing characteristics for the floor and/or heating. Higher power generally results in shorter heat providing circuits, which is an advantage when cutting off the panels since the part of the panel without heating due to the cutting off becomes small. However, for lower powers per floor area, the resistances of the heat providing circuits are less critical than for higher powers and lower resistances.

Detailed exemplary embodiments and advantages of the panel, the heating system, and the method according to the invention is hereafter described with reference to the appended drawings illustrating some preferred embodiments.

BRIEF DESCRIPTION OF THE DRAWINGS

Embodiments of the invention are described in more detail with reference to attached drawings illustrating examples of embodiments of the invention in which:

FIGS. 2a-d show schematic end views of sections of a panel according to some embodiments of the present invention, FIGS. 3a-d show schematic end views of sections of a panel according to some embodiments of the present invention, FIGS. 4a-e show schematic views of a panel according to some embodiments of the present invention.

DETAILED DESCRIPTION OF INVENTION

Figure 1:
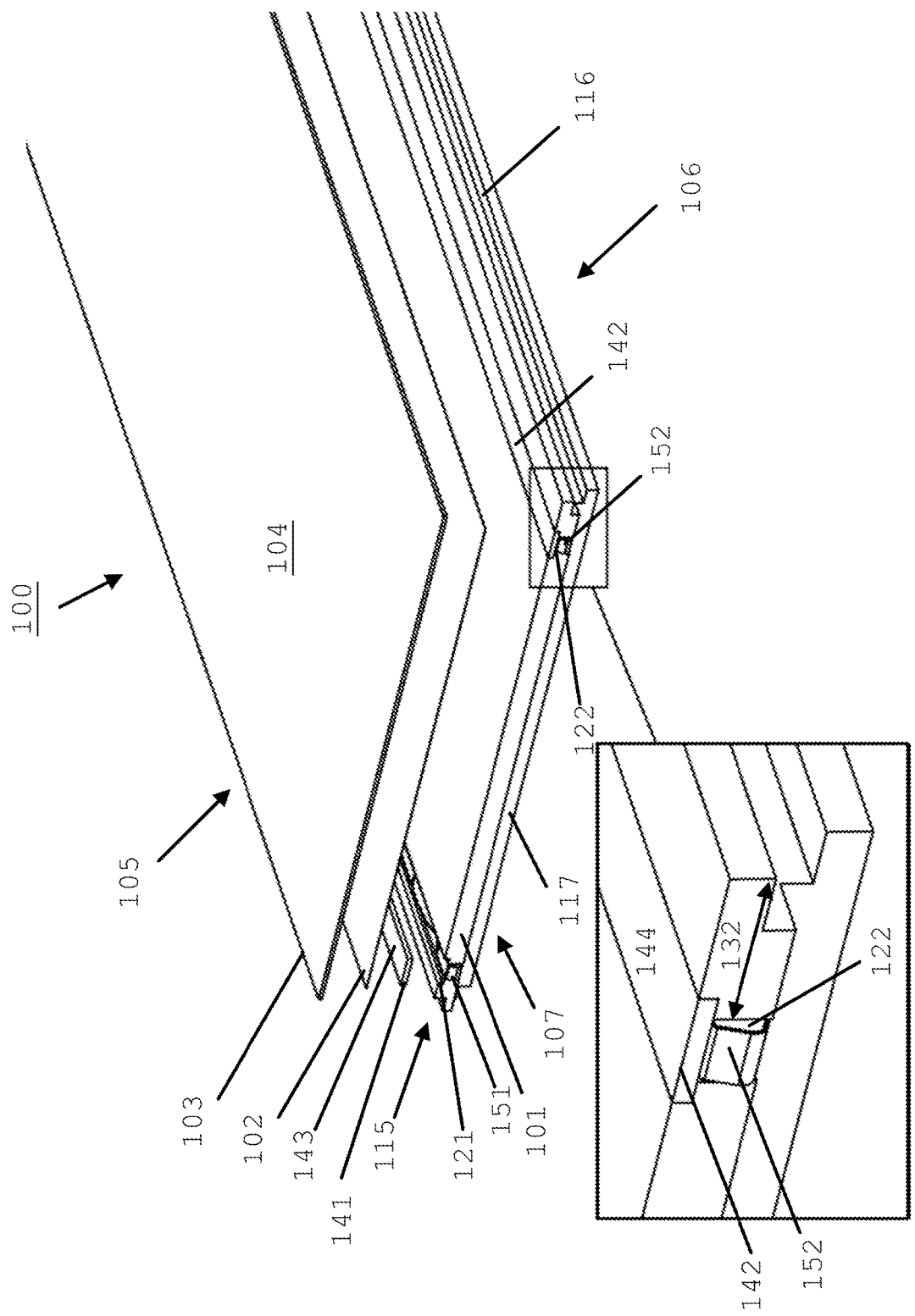
FIG. 1 shows a schematic end view of a panel according to some embodiments of the present invention.

FIGS. 1, 2a-d, 3a-d, and 5a-b schematically show views of a panel 100 according to some embodiments of the present invention.

The panel 100 is delimited by a first longitudinal side 105 and by a second longitudinal side 106 being opposite the first longitudinal side 105. The panel 100 is also delimited by a first end side 107 and by a second end side 108 being opposite the first end side 107.

Figure 6:
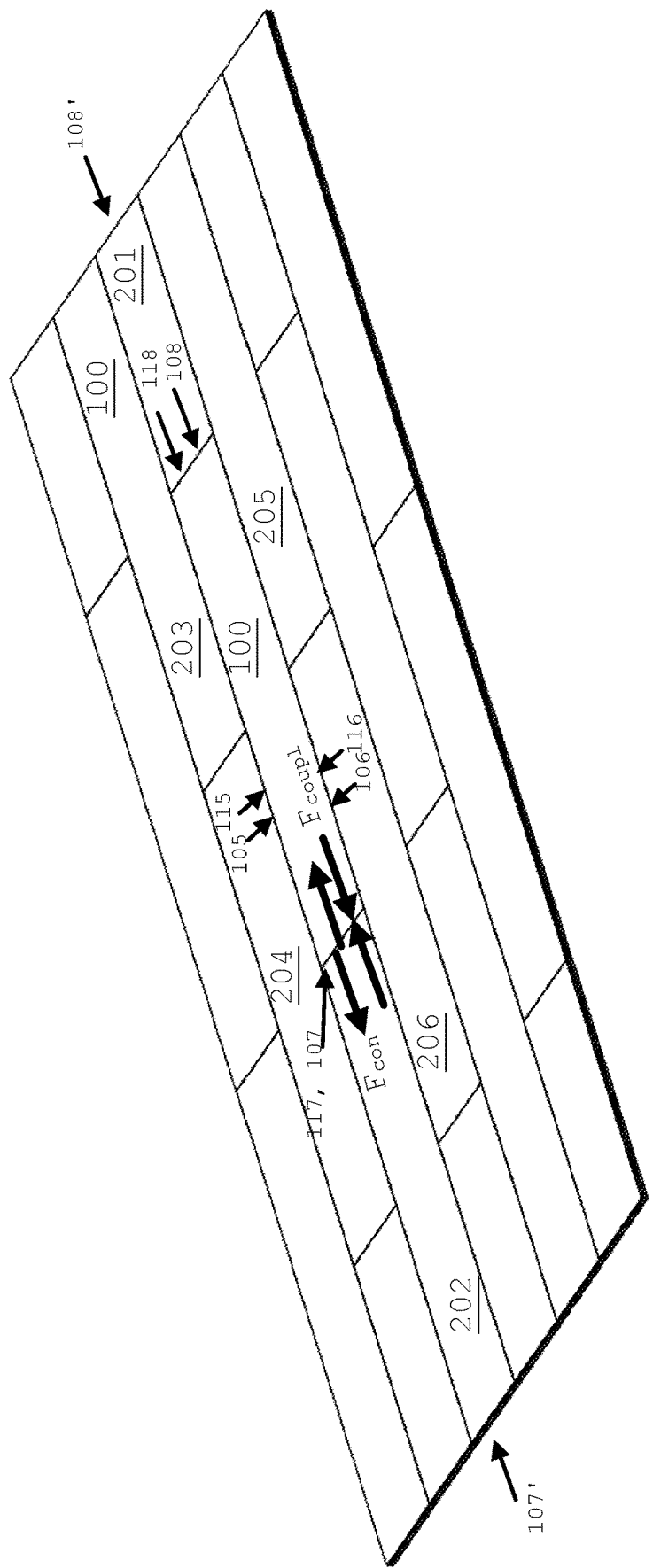
FIG. 6 shows a floor including panels according to some embodiments of the present invention, FIG. 7 schematically shows a heating system according to some embodiments of the present invention, FIG. 8 schematically shows a heating system according to some embodiments of the present invention, FIG. 9a schematically shows a complete a heating system according to some embodiments of the present invention, FIG. 9b schematically shows heating system according to some embodiments of the present invention, and FIGS. 10a-b schematically show some embodiments of electrical end connectors.

The first longitudinal side 105, the second longitudinal side 106, the first end side 107, and the second end side 108 may be provided with panel coupling means, such as e.g. "click joints" 115, 116, 117, 118, respectively. The panel coupling means 115, 116, 117, 118 are, according to an embodiment, arranged in the base layer 101 at the first 105 and second 106 longitudinal sides of the panel, and at the first 107 and second 108 end sides of the panel, for mechanically coupling the panel 100 to at least one adjacent panel 201, 202, . . . 206, i.e. to at least one other corresponding panel 201, 202, . . . , 206 (as shown in FIG. 6), where the at least one other corresponding panel is provided with corresponding panel coupling means.

The panel 100 further includes a base/core layer 101 and a covering/visual layer 103. The covering/visual layer 103 has a surface 104 possibly being visible from the space to be heated, i.e. from within the room in which the panel covers a floor, wall and/or ceiling. The covering/visual layer may have a suitable appearance/look, including colors and/or patterns.

The panel 100 further includes heat providing layer 102 attached to the base layer 101, i.e. arranged between the base layer 102 and the covering/visual layer 103. This also means that the heat providing layer is arranged very close to the space to be heated, i.e. directly underneath the thin covering/visual layer 103. The heat providing layer 102 may include essentially any material being electrically conducting and having an electrical resistance suitable for creating heat, i.e. an increased temperature, when current flows through the material. The material may be formed as a heat generating element, which may have a large number of shapes. For example, the heat providing layer may comprise printed electronics, a film, one or more resistors, a sheet, a tape, a paint, or may have essentially any other shape or form suitable for creating heat through its electrical resistance and for being included in the panel according to the present invention. Thus, for example, the heat providing layer 102 may comprise at least one heat generating element including printed electronics having an electrical resistance, at least one film having an electrical resistance, and/or one or more resistors having an electrical resistance.

As a non-limiting example, it may be mentioned that, when the electric energy has a voltage of 25 V, i.e. when the electrical energy providing arrangement delivers a voltage of 25 V is used as power supply, 23 W/m$_2$ may be created by the heat providing layer according to an embodiment. The time constant for the temperature increase at the covering layer may be short, in the area of minutes, and a temperature increase of e.g. 3° C. may be quickly achieved.

The voltage drop increases with the squared length of the floor. For shorter floors, e.g. floors having a length shorter than 10 m, the voltage drop has little effect on the created heat. However, for longer floors, e.g. floor longer than 15 m, the voltage drop may noticeably affect the produced heat.

According to an embodiment of the present invention, the heat providing layer 102 is arranged at a heat depth $D_{heat}$ from the visible surface 104 in an interval of 0.1 mm-3 mm, 0.4 mm-1 mm, or 0.5 mm-0.8 mm, and/or at a depth of 0.6 mm. This then also means that the covering layer has a thickness $T_{cov}$ being equal to the heat depth $D_{heat}$; $T_{cov}=D_{heat}$; which results in an efficient transport of heat energy into the space to be heated, since the heat providing layer 102 is very close to the heated space.

According to an embodiment of the present invention, the layers of the panel 100, i.e. the base layer 101, the heat providing layer 102 and the covering layer 103 are attached/fixed to each other by use of an adhesive, such as e.g. a glue.

The panel according to the present invention includes a first longitudinal groove 121 arranged in parallel with, and having at least a first distance 131 to, the first longitudinal side 105, and a and second longitudinal groove 122 arranged in parallel with, and having at least a second distance 132 to, the second longitudinal side 106. The first 121 and second 122 longitudinal grooves are arranged in the base layer 101 of the panel, and extend from the first end side 107 to the second end side 108. The first 121 and second 122 longitudinal grooves face the heat providing layer 102, i.e. the opening/aperture of the groves are directed towards the heat providing layer 102.

According to an embodiment, a first longitudinal coupling element 141 is arranged in the first longitudinal groove 121, and a second longitudinal coupling element 142 is arranged in the second longitudinal groove 122. The first 141 and second 142 longitudinal coupling elements then extend in the first 121 and second 122 longitudinal grooves, respectively, from the first end side 107 to the second end side 108, i.e. along essentially the whole length of the panel.

At the first end side 107 of the panel, a first electrical end connector 151 and a second electrical end connector 152 may be arranged. At the second end side 108 of the panel, a first electrical end connector 151 and a second electrical end connector 152 may be arranged. The first 151 and second 152 electrical end connectors may be arranged in the first 121 and second 122 longitudinal grooves, respectively, and protrude from at least one of the first 107 and second 108 end sides. The first 151 and second 152 electrical end connectors may be arranged for being electrically connected to the heat providing layer 102 by means of the first 141 and second 142 longitudinal coupling elements. This electrical coupling may be provided via the first 141 and second 142 longitudinal coupling elements and/or by direct coupling to the heat providing layer 102. The first 151 and second 152 electrical end connectors are arranged for being electrically connectable to at least one corresponding end connector of at least one adjacent panel 201, 201, . . . , 206 (shown in FIGS. 6 and 10*a*). The first 151 and second 152 electrical end connectors may be at least partly resilient, thereby providing a connecting force $F_{con}$ being essentially perpendicular to the at least one of the first 107 and the second 108 end sides when the panel 100 is coupled to at least one adjacent panel 201, 202. The at least one connecting force $F_{con}$ is directed towards at least one corresponding end connector of the at least one adjacent panel 201, 202, respectively, as illustrated e.g. in FIGS. 6 and 10*a*. As described more in detail below, the connecting force $F_{con}$ is created by its resilience in combination with a coupling force $F_{coup1}$ caused by the panel coupling means coupling the panel and adjacent panels together.

The panel 100 may, according to some embodiments of the present invention, include further longitudinal grooves, i.e. may in total include more than two longitudinal grooves. The panel then also includes further corresponding longitudinal coupling elements, and further corresponding electrical end connectors.

FIGS. 2*a-d* and 3*a-d* schematically show cross-sectional views of a part of the panel 100 including the first longitudinal groove 121 formed in the base layer 101 of the panel at the first distance 131 to the first longitudinal side 105. The heat providing layer 102 is attached to the base layer 101, and the covering layer 103 is attached to the heat providing layer 102.

According to an embodiment of the present invention, the first 143 and second 144 surfaces of the first 141 and second 142 longitudinal coupling elements facing the heat providing layer 102 are, when the panel 100 is assembled, aligned with the rest of the surface 145 of the base layer 101. Thus, the surface 145 of the base layer 102 outside of the first 121 and second 122 longitudinal grooves and the first 143 and second 144 surfaces of the first 141 and second 142 longitudinal coupling elements, respectively, are on the same level, such that an essentially flat common surface 143, 144, 145 facing the heat providing layer 102 is created by the base layer 102 and the first 141 and second 142 longitudinal coupling elements. Hereby, a very robust panel is achieved, which copes with essentially all sorts of pressure on the covering layer 103.

According to an embodiment, schematically illustrated in FIGS. 2*c-d*, the first 141 and second 142 longitudinal coupling elements comprise an at least partly resilient and electrically conducting material, such as e.g. an electrically conducting metal. These first 141 and second 142 longitudinal coupling elements may then by this resilience create a pressing force against the side and/or bottom walls of the first 121 and second 122 longitudinal grooves, which securely fixates the first 141 and second 142 longitudinal coupling elements within the first 121 and second 122 longitudinal grooves. The first 141 and second 142 longitudinal coupling elements may for example be essentially U-shaped, and may be inserted upside-down in the first 121 and second 122 longitudinal grooves while the legs of the U-shaped elements are pressed together, whereby a spring force towards the inside walls of the first 121 and second 122 longitudinal grooves is created.

According to another embodiment of the present invention, schematically illustrated in FIGS. 3*a-b*, the first 141 and second 142 longitudinal coupling elements comprise a solid and electrically conducting material, such as e.g. an electrically conducting metal.

Figure 5A:
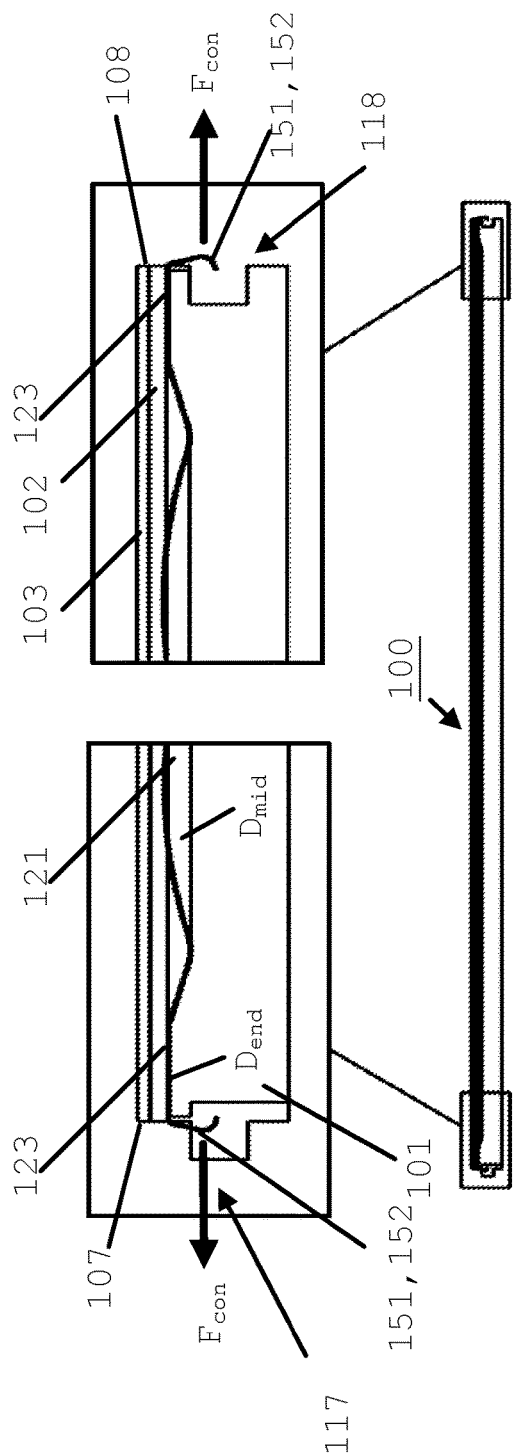
FIGS. 5a-b show schematic views of a panel according to some embodiments of the present invention, FIG. 5c schematically shows an example of an electrical end connector according to an embodiment of the present invention.
Figure 5B:
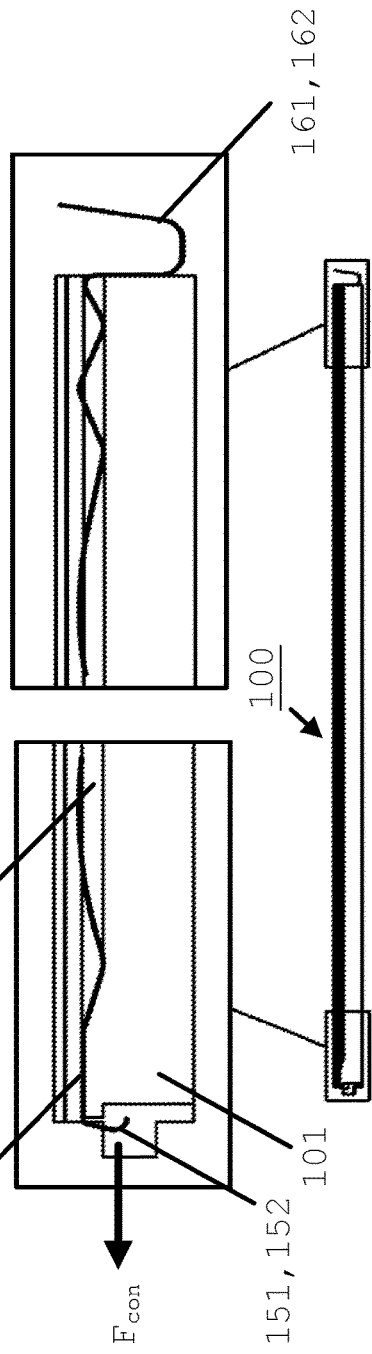

The first 151 and at least one second 152 electrical end connectors may then for the embodiments shown in FIGS. 2*c-d* and 3*a-b*, be electrically connected to the heat providing layer 102 by being arranged in the first 121 and second 122 longitudinal grooves. The electrical connection may be provided via the electrically conducting at least first 141 and second 142 longitudinal coupling elements. The heat providing layer 102 may here be arranged between the covering layer 103 and the first 141 and second 142 longitudinal coupling elements, as shown in FIGS. 2*c-d* and 3*a-b*. The heat providing layer 102 may be attached to the first 141 and second 142 longitudinal coupling elements, e.g. by an electrically conducting adhesive and/or an electrically conducting soldering. The first 151 and second 152 electrical end connectors and/or the first 161 and second 162 electrical power supply end connectors may here be arranged between the bottom of the first 121 and second 122 longitudinal grooves and the first 141 and second 142 longitudinal coupling elements, as is also illustrated in FIGS. 5*a-b*. Thus, the first 151 and second 152 electrical end connectors may be fixed in the panel 100 by being pressed against the bottom of the first 121 and second 122 longitudinal grooves by the first 141 and second 142 longitudinal coupling elements.

According to another embodiment, schematically illustrated in FIGS. 3*c-d*, the heat providing layer 102 is arranged on the surface 145 of the base layer 102 outside of the first 121 and second 122 longitudinal grooves and in the first 121 and second 122 longitudinal grooves between the base layer 101 and the first 141 and second 142 longitudinal coupling elements, respectively. The first 141 and second 142 longitudinal coupling elements may here be either electrically non-conducting, e.g. of an electrically isolating material such as wood or a plastic material, or may be electrically conducting, e.g. of a metal. The primary function of the first 141 and second 142 longitudinal coupling elements is here to press the heat providing layer 102 against the first 151 and second 152 electrical end connectors and/or the first 161 and second 162 electrical power supply end connectors being inserted/arranged into the first 121 and second 122 longitudinal grooves, such that an electrical contact/connection between the heat providing layer 102 and the first 151 and second 152 electrical end connectors is secured.

Also, the U-shaped and at least partly resilient first 141 and second 142 longitudinal coupling elements illustrated in FIGS. 2c-d may also be arranged such that the heat providing layer 102 is arranged in the first 121 and second 122 longitudinal grooves between the base layer 101 and the first 141 and second 142 longitudinal coupling elements, respectively. Thus, the heat providing layer 102 would then be arranged in the first 121 and second 122 longitudinal grooves with the first 141 and second 142 longitudinal coupling elements inserted in the grooves on top of the heat providing layer 102, and on the surface 145 of the base layer 102 outside of the first 121 and second 122 longitudinal grooves. The legs of the U-shaped elements may then be pressed together at insertion into the grooves, whereby a spring force at least towards the inside walls of the first 121 and second 122 longitudinal grooves is created after insertion. This also results in that the first 141 and second 142 longitudinal coupling elements and the heat providing layer 102 are pressed firmly against each other, resulting in a reliable electrical contact between the two, at the same time as the wear on the heat providing layer 102 is minimized.

Figure 4A:
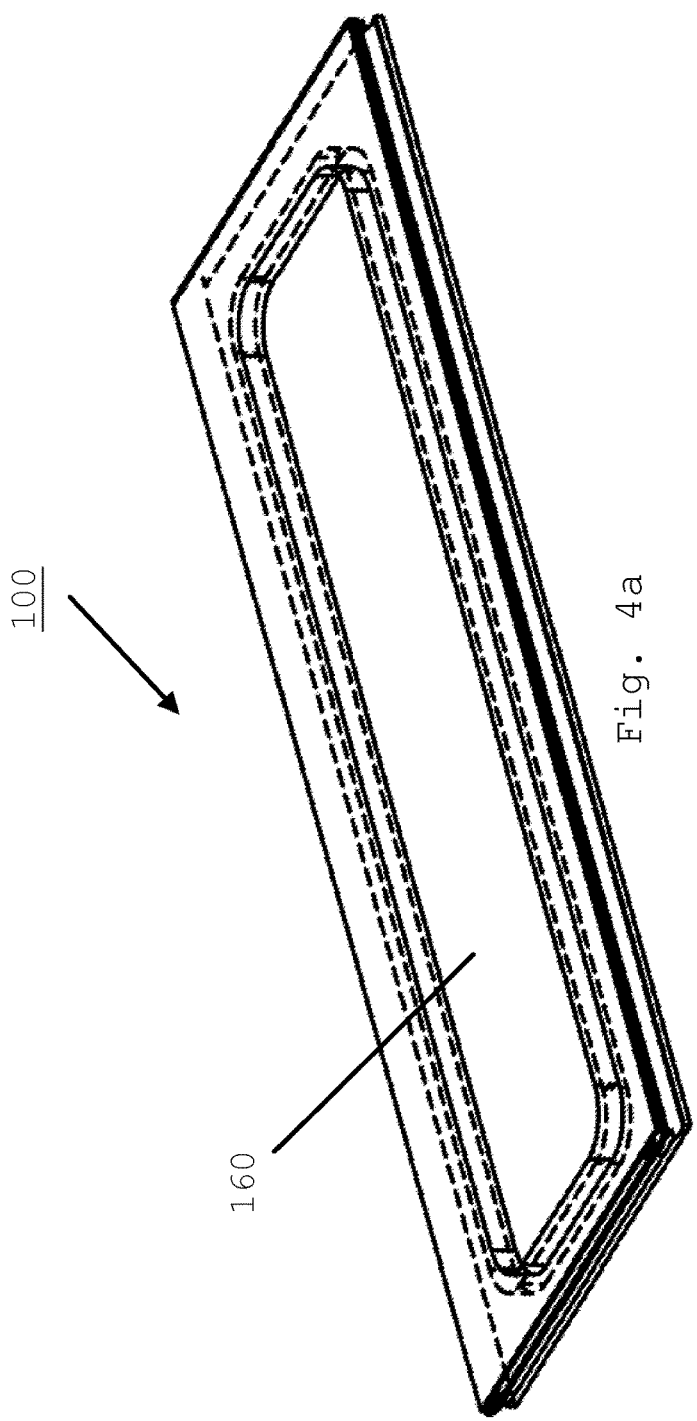
Figure 4B:
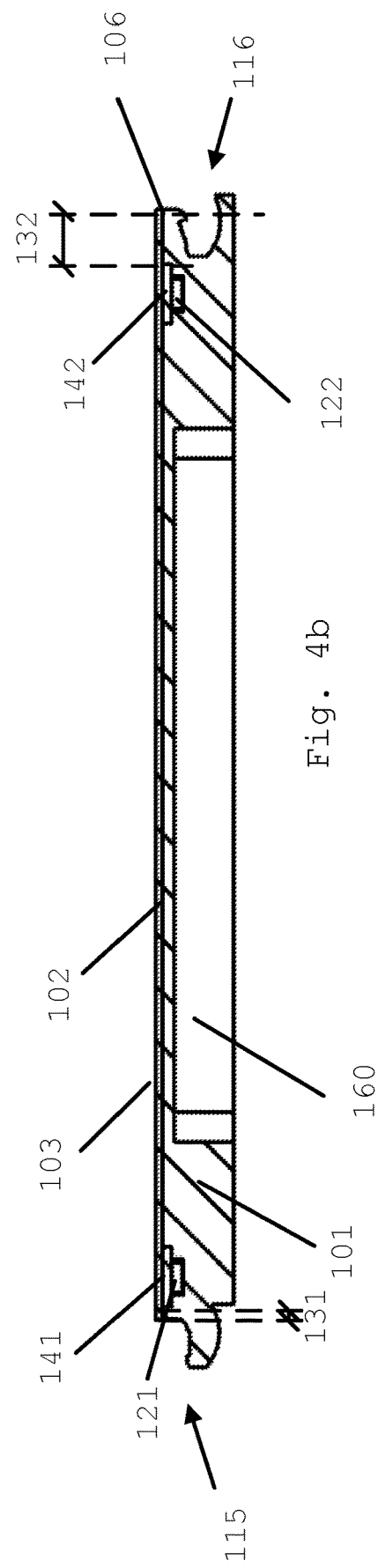

FIGS. 4a-b illustrate an embodiment of the present invention, in which the panel 100 includes at least one sandwich/isolating core 160 included in the base layer 101. The at least one sandwich/isolating core 160 may have heat insulating properties, preventing that created heat is transported in the wrong direction, i.e. away from the space to be heated. For example, a temperature increase of e.g. 3° C. for a panel without insulation could result in a temperature increase of e.g. 5-6° C. for the same panel with at least one sandwich/insulating core 160 added to the base layer 101. The at least one sandwich/insulating core 160 may also have sound absorbing properties, which then efficiently reduces the noise of e.g. high heels being walked across the floor.

The sandwich/isolating core 160 may e.g. include polyurethane, for example in form of a polyurethane foam being injected at and/or after assembly of the layers of the panel 100.

FIGS. 4c-e illustrate some embodiments of the present invention, in which the panel 100 includes at least one sandwich/insulating core 160 included in the base layer 101. The at least one sandwich/insulating core 160 may here e.g. include pyramid formed support elements E that may, by the side surfaces A, B of the pyramid forms, provide supportive force/pressure from the pyramid formed support elements E on the corresponding pyramid formed parts D of the base layer 101 of the panel 100, such that they may carry heavier loads. The pyramid formed support elements E may have their base side towards the floor and the pointed side towards the covering layer 103. As mentioned above, the at least one sandwich/insulating core 160 may have heat and/or sound insulating properties. Thus, the pyramid shaped support elements provide optimal insulation in combination with an optimal carrying capacity for the panel 100.

FIG. 4e illustrate an embodiment, for which load/weight carrying element 170 are arranged between the sandwich/insulating core pyramid forms 160 in the base layer 101 material, which may be e.g. wood or some other material suitable for carrying weight. The load carrying element 170 may for example have a circular form, e.g. may be essentially screw/bolt formed with a wider circular head part and a thinner circular pointed part, with the wider part directed towards the covering layer 103. The load carrying element 170 may be of essentially any load carrying material, such as e.g. metal or plastic. The circular head part of the load carrying element 170 is arranged for carrying weight/load originating from the covering layer 103, such that the bottom regions of the pyramid formed parts D of the base layer 101 may be less strong, i.e. do not have to be strong enough to itself take up the whole carrying weight/load. Thus, the weight/load originating from the covering layer is here at least partly carried by the load carrying elements 170.

The load carrying elements 170 may be casted/moulded together with base layer 101 material in order to improve the load carrying capabilities of the panel, i.e. to improve the load/weight carrying capabilities of the base layer 101 material. Hereby, a less stable and more porous material may be used for the rest of the base layer 101 material, which lowers the production costs.

According to an embodiment of the present invention, one or more of the first 151 and second 152 electrical end connectors are at least partly resilient. Such example embodiments are illustrated in FIGS. 5a-c. The resilient first 151 and second 152 electrical end connectors may provide a connecting force $F_{con}$ being essentially perpendicular to the first 107 and second 108 end sides, respectively, when being coupled to an adjacent corresponding panel. The connecting force $F_{con}$ is then directed towards a corresponding at least one end connector of the at least one adjacent corresponding panel 201, 202, . . . , 206 (as shown in FIGS. 5c-d and 10a). The connecting force $F_{con}$ creating the electrical contact is then created by a coupling force $F_{coupl}$ created by the panel coupling means 117, 118 coupling the adjacent panels together (as schematically illustrated in FIGS. 6 and 10a).

According to an embodiment or the present invention, the first 121 and second 122 longitudinal grooves have an end depth $D_{end}$ adjacent 123 to at least one of the first 107 and second 108 end sides, wherein this end depth $D_{end}$ is smaller than a depth $D_{mid}$ along a rest of the first 121 and second 122 longitudinal grooves; $D_{end} < D_{mid}$. The first 121 and second 122 longitudinal grooves may have this depth $D_{mid}$ apart from at the ends 123 adjacent to the end sides 107, 108, e.g. in the middle of the length of the first 121 and second 122 longitudinal grooves. The end depth $D_{end}$ may for example correspond to a thickness $T_{con}$ of the first 151 and second 152 electrical end connectors and of possible longitudinal coupling elements 141, 142; $D_{end} = T_{con}$; such that there are no air gaps at the first 107 and second 108 end sides of the panel. Hereby, a very robust panel is provided. Often, the wear of e.g. flooring panels is worst close to the joints, at the first 107 and second 108 end sides and/or at the first 105 and second 106 longitudinal sides, which is mitigated by this embodiment providing robust panel ends.

As illustrated in FIGS. 5a-b and 10a, the first 151 and second 152 electrical end connectors may protrude slightly from the first 107 and second 108 end sides. When the first end side 107 of the panel 100 is coupled to a second end side 108' of another panel 202, the first 151 and second 152 electrical end connectors of the two panels 100, 202 are pressed against each other with the above mentioned coupling force $F_{coupl}$. The connecting forces $F_{con}$ of the first 151 and second 152 electrical end connectors of the two panels 100, 202 are then created and are directed towards/against each other, whereby a solid contact between the respective first 151 and second 152 electrical end connectors of the two panels 100, 202 is provided. Hereby, a solid electrical connection between the two panels 100, 202 is also provided. A reliable electrical power supply to all panels of a floor is thus achieved.

As illustrated e.g. in FIG. 5b, first 161 and second 162 electrical power supply end connectors, may be used on one end side 108 of the panel, if this end side is the end side starting a row of panels, i.e. is the end side facing a wall, socket or the like from which the electrical power is provided to the row of panels. These first 161 and second 162 electrical power supply end connectors may be essentially any kind of connector/terminal creating a solid electrical connection, such as e.g. a cable terminal (shoe) as illustrated in FIG. 5b, providing a connection force between the first 161 and second 162 electrical power supply end connectors and the corresponding connectors coupled thereto. When such a cable terminal (shoe) is used, the power supply may be provided by essentially any cable or the like comprising a connector being connectable to the first 161 and second 162 electrical power supply end connectors. Other non-limiting examples of such connectors/terminals are described below.

FIG. 5c shows side views of a non-limiting example of a first 151 or second 152 electrical end connector. The electrical end connector 151, 152 includes an essentially straight/flat section 153 to be positioned in the first 121 and second 122 longitudinal grooves adjacent 123 to the first 107 or second 108 end sides, where the depth of the grooves may be the end depth $D_{end}$. As mentioned above, the end depth $D_{end}$ may here be equal to the thickness $T_{con}$ of the electrical end connector and possibly also of the longitudinal coupling elements 141, 142; $D_{end}=T_{con}$.

The electrical end connector 151, 152 may also includes an essentially wave formed section 154 to be positioned in the first 121 and second 122 longitudinal grooves where the grooves have the above mentioned depth $D_{mid}$, at a distance from the end sides 107, 108 of the panel. The wave forms of the wave formed section 154 may have a bight $T_{mid}$, possibly including the thickness of the longitudinal coupling elements 141, 142, being essentially equal to the depth of the grooves; $T_{mid}=D_{mid}$.

The electrical end connector 151, 152 also includes a protruding section 155 causing the above mentioned connecting force $F_{con}$. Between the straight/flat section 153 and the protruding section 153, the electrical end connector 151, 152 is bent in a non-perpendicular angle, tilting the protruding section 155 slightly in an outward direction when mounted in the panel 100. This tilted direction/angle α of the protruding section 155 and the resilience of the electrical end connector 151, 152 results in the connecting force $F_{con}$ when the panel 100 is coupled to other panels. As a non-limiting example, the tilted angle α may be in the interval of 5° to 15°, and may according to a specific example be 10°.

The electric energy being conveyed to the heat providing layer by the first 151 and second 152 electrical end connectors, and possibly the first 141 and second 142 longitudinal electrical coupling elements, may have a voltage in the interval of 5 Volts-60 Volts, or in the interval of 10 Volts-55 Volts, or in the interval of 15 Volts-50 Volts, or in the interval of 25 Volts-50 Volts. The panel according to the present invention may be supplied by such low voltages since the electrical contact between adjacent panels, and possibly also the current/voltage conducting characteristics of the first and second longitudinal electrical coupling elements, and therefore of the panel itself, are very good.

According to an example embodiment of the present invention, the electric energy being supplied to the heat providing layer 102 in order to create the heat has a voltage V of 25 Volts; V=25 volt, which in many regions and/or countries may be handled by a layman, i.e. by a non-electrician.

According to another example embodiment of the present invention, the electric energy has a voltage V of 50 Volts; V=50 volt, which in some regions and/or countries may be handled by a layman.

Figure 7:
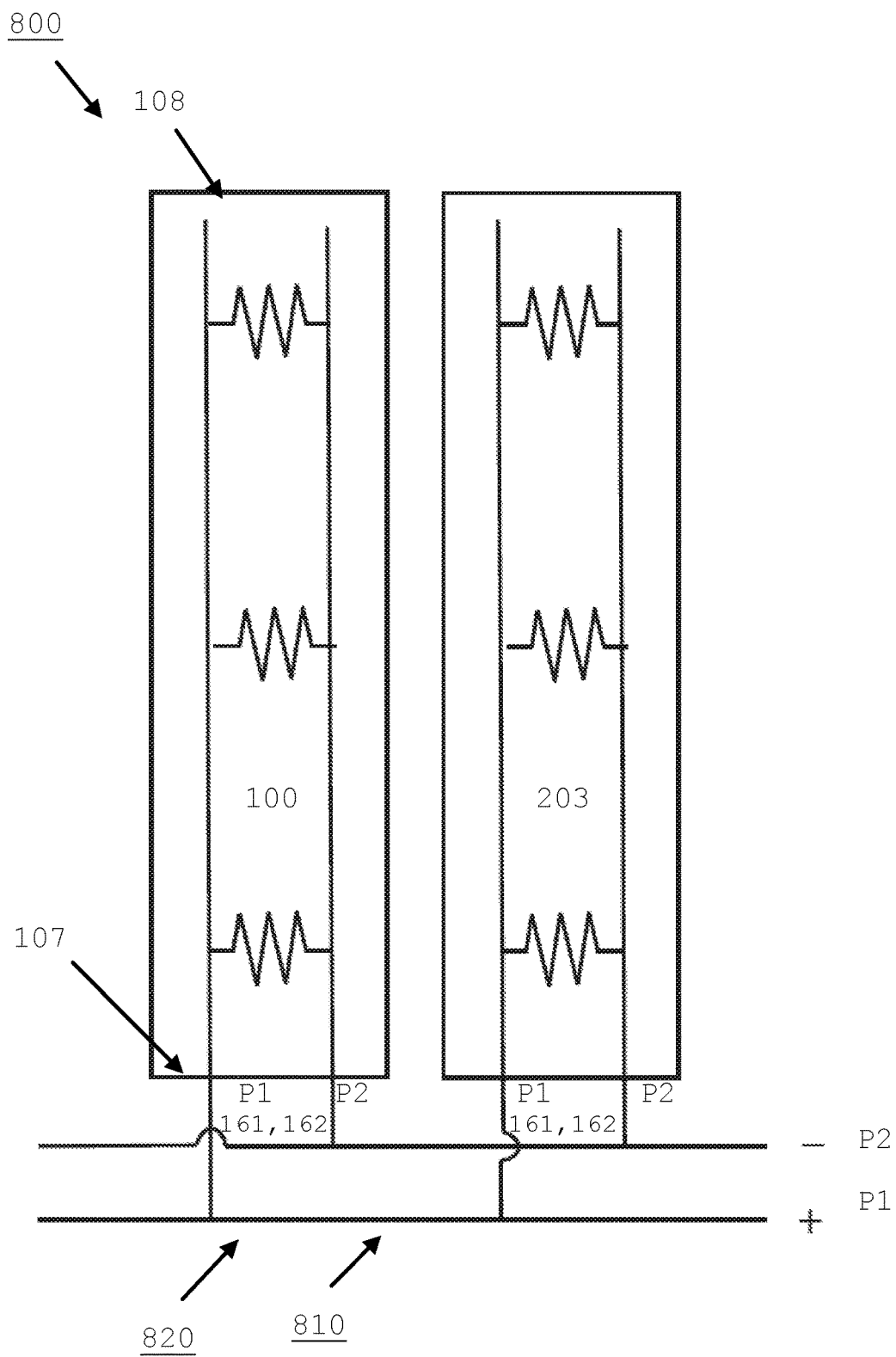

According to an aspect of the present invention, a heating system 800 is presented. The heating system 800, is schematically illustrated in FIG. 7, and includes at least one panel 100, 203 as described above. The heating system further includes an electrical energy providing arrangement 810, arranged e.g. at a mounting base 820 and/or facing the base layer 101 adjacent to at least one of the first 107 and the second 108 end sides of the at least one panel 100, 203. The electrical energy providing arrangement 810 supplies the electric energy to the first 161 and second 162 electrical power supply end connectors of the panel 100. In FIG. 7, only two panels 100, 203 are shown for simplicity. As is clear for a skilled person, many more panels may be included in the heating system 800. Also, each one of the panels 100, 203 in FIG. 7 may represent a row of panels. It should be noted that the electrical energy providing arrangement 810 described in this document may be used for supplying electrical energy to essentially any electrically heated panel, i.e. not only to the herein described panel 100.

According to the embodiment shown in FIG. 7, the electrical energy is provided by first and second polarities P1, P2 being supplied to the first 161 and second 162 electrical power supply end connectors of the first end side 107 of the panel 100, or to a corresponding first end side 107' of an adjacent panel 202 coupled directly or indirectly to the first end side 107 of the panel 100. Thus, both the first and second polarities P1, P2 are connected to a first end side 107 of a first panel 100, 203 in each row of panels being coupled together at their end sides 107, 108. The first and second polarities P1, P2 are then electrically connected to further panels in each row of panels, laid as illustrated in FIG. 6, such that all panels of the whole floor/wall/ceiling are electrified. Hereby, the whole area covered by the panels is heated. Since the voltage used in FIG. 7 is rather low, e.g. 25 Volts, both of the first and second polarities P1, P2 may be supplied to the same end side 107 of the panel. This is possible since the risk for a dangerous electric shock of a person installing the panels is essentially non-existing at these low voltages.

Figure 8:
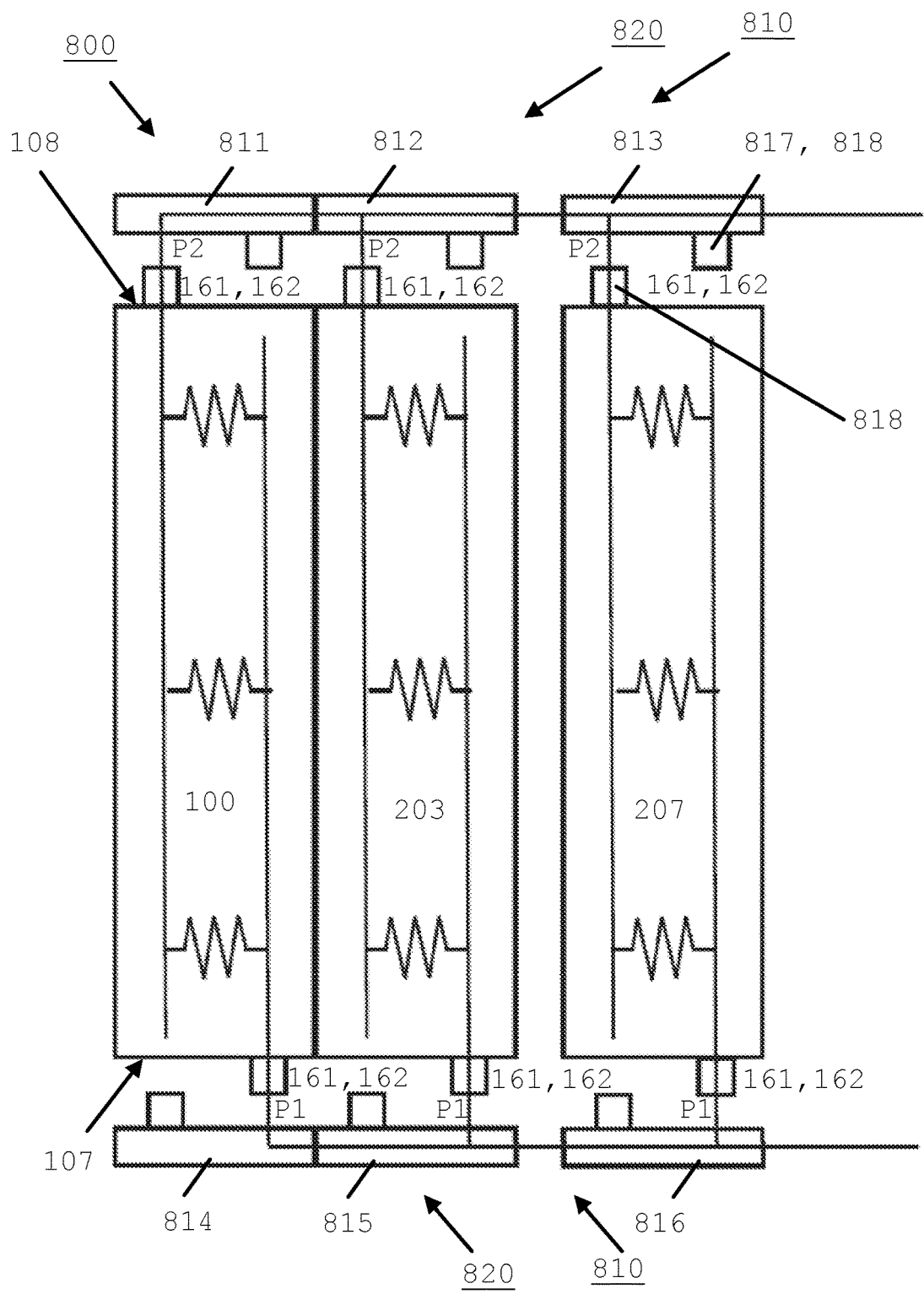

According to another embodiment of the present invention, the electric energy has a voltage of 50 Volts; V=50 Volts; which in some regions and/or countries may be handled by a layman, i.e. by a non-electrician. A heating system 800 is schematically illustrated in FIG. 8, which includes at least one panel 100, 203, 207 as described above. The heating system further includes an electrical energy providing arrangement 810, arranged e.g. at a mounting base 820 and/or facing the base layer 101 on two opposite sides of a floor, wall or ceiling, and adjacent to at both the first 107 and the second 108 end sides of the at least one panel 100, 203, 207. It should be noted that the electrical energy providing arrangement 810 described in this document may be used for supplying electrical energy to essentially any electrically heated panel, i.e. not only to the herein described panel 100.

The electrical energy providing arrangement 810 may include contact means 811, 812, 813, 814, 815, 816, each one being arranged for providing one polarity P1, P2 to the panel 100, 203, 207 by use of a contact protrusion 817 and/or first 161 and second 162 electrical power supply end connectors. The contact means 811, 812, 813, 814, 815, 816 and/or the panels 100, 203, 207 may also include a stability protrusion 818.

When the contact means 811, 812, 813, 814, 815, 816 are assembled with, i.e. are inserted into, the panels 100, 203, 207, the electrical energy is provided to the panels 100, 203, 207 by the contact protrusions 818, and the panels 100, 203, 207 are held in place by the stability protrusions 817. Also, the electrical energy, i.e. the voltage creating the heat in the panels 100, 203, 207, is encapsulated within the panels 100, 203, 207 by the contact means 811, 812, 813, 814, 815, 816. The risk for getting an electric shock is therefore minimized for the heating system 800 illustrated in FIG. 8, partly due to the encapsulated electrical energy, and partly because the two polarities P1, P2 are provided to opposite sides of a floor, wall or ceiling being covered by the panels, and are therefore difficult, often impossible, for a person to come in contact with both of P1 and P2 at the same time.

Also, the voltage drop over the heat providing layer is approximately reduced by 50% when the two polarities P1, P2 are provided to opposite sides of a floor.

According to an embodiment of the present invention, schematically illustrated in FIG. 8, the electrical energy is thus provided to the panel 100 by the first polarity P1 being supplied to the first 161 or second 162 electrical power supply end connectors of the first end side 107 of a panel 100. The second polarity P2 is then supplied to the first 151 or second 152 electrical end connectors of the second end side 108 of the panel. Thus, the first polarity P1 is supplied to one end side 107 of the panel 100, and the second polarity P2 is supplied to the opposite end side 108 of the panel 100.

Also, the second polarity P2 may be supplied to the first 161 or second 162 electrical power supply end connectors of a corresponding first end side 107' of an adjacent panel 202 coupled directly or indirectly to the first end side 107 of the panel 100, as illustrated in FIG. 6. Also, the second polarity P2 may be supplied to the first 161 or second 162 electrical power supply end connectors of a corresponding second end side 108' of an adjacent panel 201 coupled directly or indirectly to the second end side 108 of the panel 100.

The electrical energy providing arrangement 810 thus supplies the electric energy to the first 161 and second 162 electrical power supply end connectors on two opposite end sides of the at least one panel 100, 203, 207. In FIG. 8, only three panels 100, 203, 207 are shown for simplicity. As is clear for a skilled person, however, many more panels may be included in the heating system 800. Also, each one of the panels 100, 203, 207 in FIG. 8 may represent a row of panels.

Figure 9A:
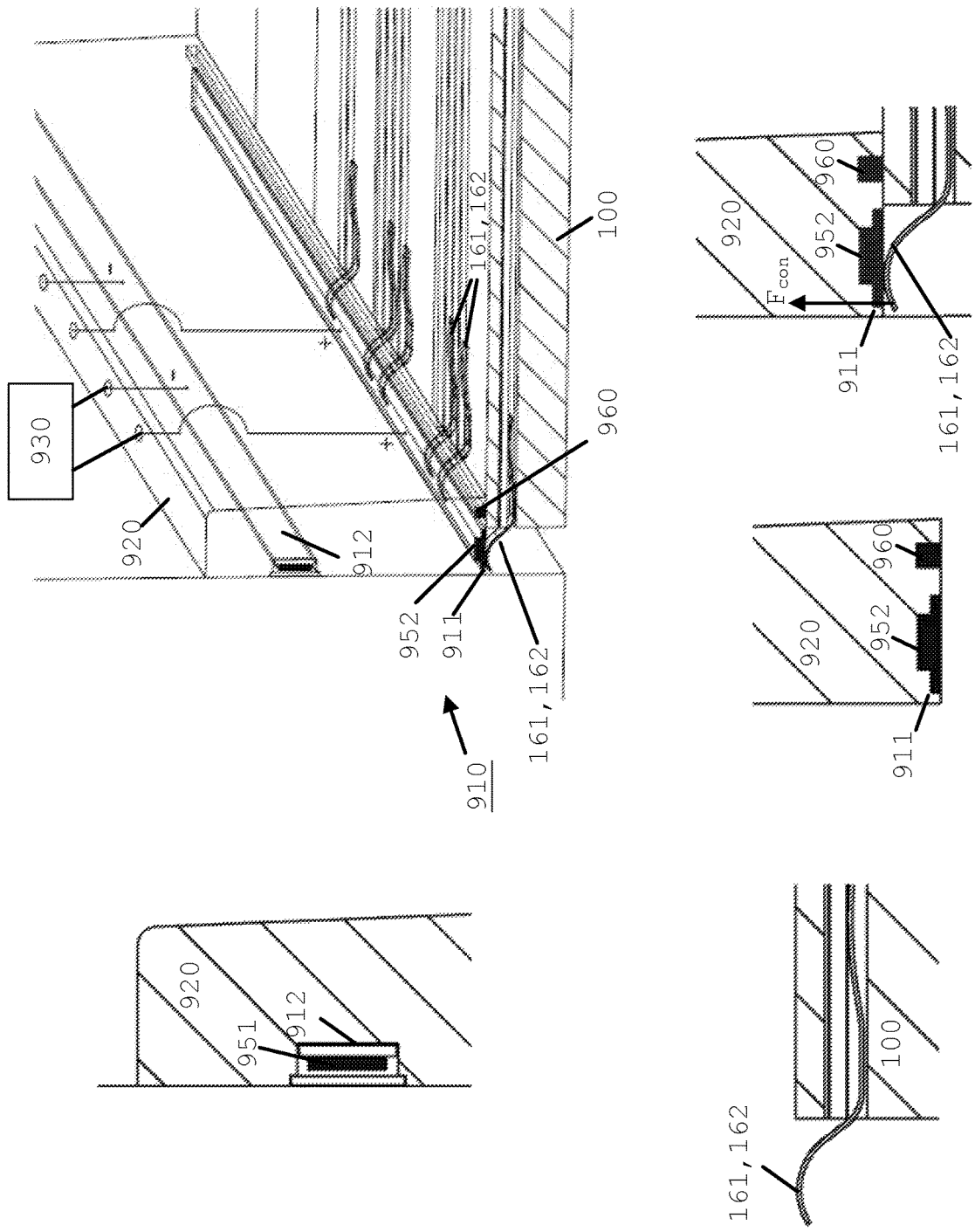

FIG. 9a schematically illustrates a complete heating system is illustrated.

As illustrated in FIG. 9a, and mentioned above, first 161 and second 162 electrical power supply end connectors, may be used on one end side 108 of the panel, if this end side is the end side starting a row of panels, i.e. is the end side facing a wall, socket or the like from which the electrical power is provided to the row of panels. These first 161 and second 162 electrical power supply end connectors may be essentially any kind of connector/terminal creating a solid electrical connection, such as e.g. a connector being at least partly resilient and slightly tilted vertically, for example in an upward direction, as illustrated in FIG. 9a, providing a connection force between the first 161 and second 162 electrical power supply end connectors and a contact means 911 of an electrical energy providing arrangement 910 including e.g. a mounting base 920 arranged for example along at least one wall on at least one side of a floor, wall or ceiling, and adjacent to the end side of the at least one panel 100.

The at least one first contact means 911 may here e.g. be arranged as an electrically conducting contact strip, possibly in metal, being arranged horizontally in the electrical energy providing arrangement 910, such that it provides for a contact surface for the slightly upwardly tilted first 161 and second 162 electrical power supply end connectors. Thus, a vertical contact force $F_{con}$ is created when the at least one panel 100 and the electrical energy providing arrangement 910, e.g. in the form of a mounting base, are mounted together.

Also, the electrical energy providing arrangement 910, e.g. included in the mounting base 920 described in this document may, as mentioned above, be used for supplying electrical energy to essentially any electrically heated panel, i.e. not only to the herein described panel 100, and/or to any other electrical energy consuming device 930, such as e.g. a wall or ceiling heating panel, a lamp or the like. The electrical energy providing arrangement 910 may for this reason include at least one second contact means 912.

According to an embodiment, the at least one first contact means 911 may be provided with first polarity P1, and the at least one second contact means 912 may be provided with another second polarity P2.

Hereby, electrical energy may by the electrical energy providing arrangement 910 supply electrical energy to essentially any electrical device 930 driven by the voltage provided by the electrical energy providing arrangement 910. For example, many kinds of lamps are driven by lower voltages, such as e.g. 25 Volt or 50 Volt, and may therefore be directly supplied with this voltage from the electrical energy providing arrangement 910.

Also, the at least one first 911 and the at least one second 912 contact means of adjacent parts of the energy providing arrangement 910, e.g. in the form of adjacent mounting base parts mounted together, may be electrically coupled by means of coupling means 951, 952, e.g. in form of sheet metal, that may possibly correspond in form and/or function to the herein described first 151 and second 152 electrical end connectors.

Figure 9B:
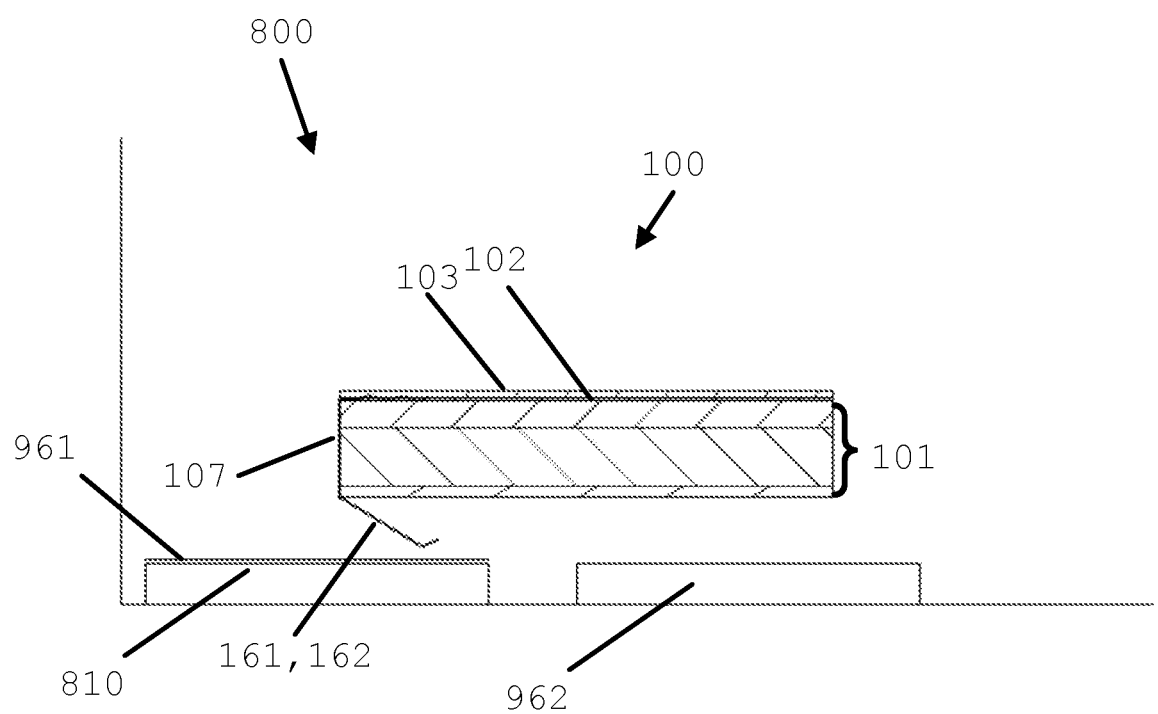

In FIG. 9b, a heating system according to an embodiment is illustrated. The electrical energy providing arrangement 810 is here located underneath the panel 100, i.e. facing the base layer 101 of the panel. The at least one first 161 and at least one second 162 electrical power supply end connectors are then bent around at least one of the first 107, 107' and the second 108, 108' end sides of the panel, and are arranged between the base layer 101 of the panel 100 and the electrical energy providing arrangement 810. Hereby, the at least one first 161 and at least one second 162 electrical power supply end connectors are pressed against, and are thus in electrical contact with, at least one part of the electrical energy providing arrangement 810. The electrical energy providing arrangement 810 may, according to an embodiment, include at least one adhesive tape comprising an electrically conducting element 961 facing the base layer 101 of the panel 100. The adhesive tape may for example be pasted/arranged on a floor adjacent to a wall, and thus also adjacent to a panel end side 107, in order to create contact with the at least one first 161 and at least one second 162 electrical power supply end connectors. On the rest of the floor, i.e. underneath the rest of the panels, a stepping layer 962, being e.g. a thin foam and/or paper layer, may cover the floor.

According to a non-limiting example schematically illustrated in FIG. 10a, the at least one first 151 and at least one second 152 electrical end connectors arranged in the at least first 121 and second 122 longitudinal grooves to protrude from at least one of the first 107 and the second 108 end sides, and being electrically connected to the heat providing layer 102. The connecting force $F_{con}$ creating the electrical contact is then created by a coupling force $F_{coupl}$ created by the panel coupling means 117, 118 mechanically coupling the adjacent panels together, and the resilience of the first 151 and second 152 electrical end connectors.

According to a non-limiting example schematically illustrated in FIG. 10b, the at least one first 151 and at least one second 152 electrical end connectors are arranged in the at least first 121 and second 122 longitudinal grooves to protrude from at least one of the first 107 and the second 108 end sides, and being electrically connected to the heat providing layer 102, may be essentially U-shaped in a section between the adjacent end sides of two adjacent panels. The U-shaped section may have a length $D_U$ corresponding to a distance between the two adjacent end sides 107, 108 of the panels. Thus, the panels are here placed at a distance $D_U$ from each other, which is common for some types of panels, such as e.g. stone or ceramic panels/plates. The U-shape of the at least one first 151 and at least one second 152 electrical end connectors allows for filling of the gap between the panels with jointing material in order to provide a joint/seam/filling between the adjacent panels. Thus, the at least one first 151 and at least one second 152 electrical end connectors provide for an electric contact between the panels, at the same time as space is made available for the joint/seam/filling.

When panels according to the present invention are to be assembled/laid to become e.g. a floor, the electrical energy providing arrangement 810, 910 described above may first be arranged/mounted at a mounting base 820, 920 and/or facing the base layer 101 on one or two sides of the room to be floored. For example, a lower voltage energy providing arrangement, providing e.g. 25 Volts may be arranged/mounted along one wall of a room and then provides both polarities P1, P2 of the voltage. A higher voltage energy providing arrangement, providing e.g. 50 Volts, may instead be arranged along two opposite sides of a room and the provides one polarity of the voltage from each opposite side of the room. Thus, the electrical energy is then available at one or two sides of the room.

A first panel 100 is then mechanically coupled to at least one second panel 201, 202 by use of the mechanical coupling means 117, 118 on the first 107 and second 108 end sides. Hereby, a row of two or more panels 100, 201, 202 is created. The last second panel 202 in such a row of panels may have to be cut such that the length of the row corresponds to the length of the room.

At the same time as the panels of the row are mechanically coupled, an electrical connection of the first panel 100 and the at least one second panel 201, 202 is achieved by the first 151 and second 152 end connectors of the first panel 100 and the at least one second panel 201, 202. Thus, as the panels 100, 201, 202 are pressed together by the mechanical coupling means 117, 118, also the end connectors 151, 152 of the panels 100, 201, 202 of the row are pressed together, thereby causing an electrical connection of the first 141 and second 142 longitudinal electrical coupling elements of the panels 100, 201, 202 in the row.

Then, the row of the first panel 100 and the at least one second panel 201, 202 is supplied with electrical energy from the electrical energy providing arrangement 810, 910. According to an embodiment described above, which is useful e.g. for lower voltages, this is done by connecting both of the first 161 and second 162 electrical power supply end connectors of the first panel 100 to the electrical energy providing arrangement 810, 910, which then supplies both of the voltage polarities P1, P2 to the first end side 107 of the first panel 100.

According to another embodiment described above, which is useful e.g. for higher voltages, the row of the first panel 100 and the at least one second panel 201, 202 is supplied with electrical energy from the electrical energy providing arrangement 810, 910 by connecting one of the first 161 and second 162 electrical power supply end connectors on the first end side 107 of the first panel 100 to the electrical energy providing arrangement 810, 910. The electrical energy providing arrangement 810, 910 then provides the first side 107 of the first panel 100 of the row of panels with one polarity P1 of the electrical energy. Then, another one of the first 161 and second 162 electrical power supply end connectors on the second end side 108' of the row, i.e. on the second side 108' of the at least one second panel 201, 202 is connected to the electrical energy providing arrangement 810, 910. The electrical energy providing arrangement 810, 910 then provides the second side 108' of the row with another polarity P2 of the electrical energy.

As mentioned above, to supply the row of panels 100, 201, 202 with one voltage polarity at each end of the row has an advantage in that the risk for a person laying the floor getting an electric shock by the electric energy being provided to the panels is considerably reduced. In order to get an electric shock, i.e. in order to come in contact with both polarities of the voltage, the person would have to reach across the room, along the whole length of the row of panels, which is not very likely. Thus, a higher voltage supply may be used with this embodiment of the invention.

In the following, some non-limiting examples descriptions of electrical properties and heating properties of a floor according to some of the herein described embodiments are presented.

A power consumption for the floor, P, is given as:

$$P=U*I; \quad (eq. 1)$$

where U is the voltage applied on the heat providing layer, and I is the corresponding applied electrical current. The applied voltage U is given by the voltage $U_{supply}$ provided by the power source minus a voltage drop $\Delta U$ between the power source and the heat providing layer, i.e.:

$$U=U_{supply}-\Delta U. \quad (eq. 2)$$

The current I flowing through the heat providing layer is given by ohm's law:

$$U=R*I; \text{ i.e.} \quad (eq. 3)$$

$$I=U/R; \quad (eq. 4)$$

where R is the resistance of the heat providing layer. The heat providing layer may be divided in heating modules/sections, where a multiple of modules/sections may be coupled in parallel. For one heat module/section the resistance is given by:

$$R=\text{resistivity}*L_{c\_heat}/A_{c\_heat}; \quad (eq. 5)$$

where the resistivity is a material parameter, e.g. for pure aluminum approximately $2.82\times10^{-8}$ ohm m, $L_{c\_heat}$ is the length of the heating conductor (resistor), and $A_{c\_heat}$ is the cross section area of the heating conductor. The cross section area of the conductor $A_{c\_heat}$ is e.g. for a thin film given as:

$$A_{c\_heat}=h_{c\_heat}*w_{c\_heat}; \quad \text{(eq. 6)}$$

where $h_{c\_heat}$ is the height/thickness of the conductor (resistor), and w is the width of the conductor (resistor).

For example, for a heating module with a heating conductor length $L_{c\_heat}$ of 62.5 m, a width of the heating conductor $w_{c\_heat}$ of 0.642 mm, and a heating conductor film thickness of 9 micrometer, the resistance R is approximately 305 ohm for aluminum.

By combining equations 1 and 4 above, the power is given by:

$$P=U^2/R; \quad \text{(eq. 7)}$$

i.e. the power increases with the square of the voltage, U, and is decreased with the inverse of the resistance R.

The power P may be written as:

$$P=(U^2*w_{c\_heat}*h_{c\_heat})/(L_{c\_heat}\times\text{resistivity}). \quad \text{(eq. 8)}$$

Because the resistivity is a material parameter, and the conducting heat film thickness is a physical parameter to be chosen, the power may be written as:

$$P=U^2*(W_{c\_heat}/L_{c\_heat})*\text{constant}. \quad \text{(eq. 9)}$$

This means that for a chosen type of heat film, the wanted power P is most easily controlled by the voltage, and then by the length $L_{c\_heat}$ and width $w_{c\_heat}$ of the heating conductor (resistor).

Since all electrical power P is converted to Joule heat Q, $P_{heat}=dQ/dt$, $P_{heat}$ is equal to P. The time derivative of Joule heat Q, dQ/dt, which corresponds to a flow of thermal energy. The heat flow, dQ/dt, will flow in the negative direction of the temperature gradient.

The power supplied P will be transformed into heat flow, dQ/dt, which will flow downwards $dQ/dt_{down}$ to the under lay structure by conduction $dQ/dt_{cond}$, and upwards, $dQ/dt_{up}$, by convection $dQ/dt_{conv}$ and radiation, $dQ/dt_{rad}$, and for non-equilibrium to the rise of the temperature of the board/panel, $dQ/dt_{board}$.

$$dQ/dt=dQ/dt_{cond}+dQ/dt_{conv}+dQ/dt_{rad}+dQ/dt_{board} \quad \text{(eq. 10)}$$

For equilibrium:

$$dQ/dt=dQ/dt_{cond}+dQ/dt_{conv}+dQ/dt_{rad} \quad \text{(eq. 11)}$$

$$dQ/dt_{down}=dQ/dt_{cond} \quad \text{(eq. 12)}$$

$$dQ/dt_{up}=dQ/dt_{conv}+dQ/dt_{rad} \quad \text{(eq. 13)}$$

For non-equilibrium the temperature of the board will be rised by $dQ/dt_{board}$.

Regarding the temporal behavior, the temperature derivative with regard to time of the board/panel is:

$$dT/dt=dQ/dt_{board}/(d*\text{density}*Cp); \quad \text{(eq. 14)}$$

where dT/dt is hence proportional to $dQ/dt_{board}$ and obviously, the temperature will rise if $dQ/dt_{board}$ is not zero.

If the board is well insulated from the underlay structure, $dQ/dt_{cond}$ will be small, and hence the temperature gradient in the board/panel will be small, therefore the temperature will approximately follow a first order differential equation. The time dependence of the board/panel will then be:

$$T_{board}=T_{initial}+(T_{end}-T_{initial})*(1-e^{-t/tau}); \quad \text{(eq. 15)}$$

where $T_{initial}$ is the temperature of the board/panel before the voltage V is applied, $T_{end}$ is the final temperature, and tau is the characteristic time constant.

$$T_{end}=P*R_{th\_tot}; \quad \text{(eq. 16)}$$

and for tau per area unit:

$$\text{tau}=c_p*\text{density}*d; \quad \text{(eq. 17)}$$

where $c_p$ is the specific heat capacity, $R_{th\_tot}$ is the total thermal resistance, density is the density of the board/panel, and d is the thickness of the board.

Regarding the heat flow dQ/dt and temperature rise of the board/panel, the temperature rise on the surface of the board/panel will be dependent on the power P, the ambient temperature $T_{amb}$, the thermal resistance downwards, $R_{th\_down}$ (between the heat film and the ambient floor), the thermal resistance between the film and the ambient air $R_{th\_up}$. Each layer of the board/panel has its own thermal resistance, i.e. for the board/panel substructure $R_{th\_sub}$, any dampening layer under the board $R_{th\_damp}$, the heating film substrate $R_{th\_substrate}$, the covering layer, $R_{th\_top}$, and for the interface between the covering layer and the ambient air, $R_{th\_conv}$. The thermal resistances downwards add in series, and the thermal resistances upwards add also in a series. However, the total thermal resistance downwards and the total thermal resistance upwards is combined in a parallel manner to a total thermal resistance, $R_{th\_tot}$:

$$R_{th\ down}=R_{th\_sub}+R_{th\_damp}; \quad \text{(eq. 18)}$$

$$R_{th\_up}=R_{th\_substrate}+R_{th\_top}+R_{th\_conv}+R_{rad} \quad \text{(eq. 19)}$$

and $$1/R_{th\_tot}=R_{th\ down}+1/R_{th\_up} \quad \text{(eq. 20)}$$

Which may be written:

$$R_{th\_tot}=(R_{th\ down}*R_{th\_up})/(R_{th\ down}+R_{th\_up}) \quad \text{(eq. 21)}$$

The temperature increase $\Delta T_{film}$ in the heating film conductor (resistance) is given by:

$$\Delta T_{film}=P*I_{th\_tot}. \quad \text{(eq. 22)}$$

The thermal resistance for a solid material $R_{th\_cond}$ due to thermal conduction is given as:

$$R_{th\_cond}=L_{material}/(\text{Lambda}*A). \quad \text{(eq. 23)}$$

The thermal resistance convection is given as:

$$R_{th\_conv}=A/U_{th\_conv} \quad \text{(eq. 24)}$$

Some non-limiting examples of materials and thermal resistances are given in Table 1 below.

TABLE 1

| Layer | Material | Lambda [W/mK] | $L_{material}$ [mm] | $R_{th}/A$ [mK/Wm²] |
|---|---|---|---|---|
| Dampening | PE | 0.33 | 2 | 57.14 |
| Board/Panel | MDF | 0.14 | 12 | 85.71 |
| Heat film | PET | 0.3 | 0.035 | 0.12 |
| Cover | Laminate | 0.3 | 0.3 | 1.00 |

In the non-limiting example above, an equal heat flow, dQ/dt, in both directions, upwards and downwards, is provided, assuming that the underlay structure has the same temperature as the ambient floor.

The heat flow due to radiation $dQ/dt_{heat}$ is given by:

$$dQ/dt_{heat}=\text{epsilon}*SB*(T_{surface}^4-T_{ambient}^4); \quad \text{(eq. 25)}$$

where epsilon is the emissivity factor and SB the Stefan-Boltzmann's constant.

For a surface in a cavity, the radiation has to consider the view factor F, so the heat flow due to radiation becomes:

$$dQ/dt_{heat} = \text{epsilon} * SB * (T_{surface}^4 - T_{ambient}^4) * F(\text{physical dimensions}); \quad \text{(eq. 26)}$$

where F ranges, i.e. is in the interval, from 0 to 1.

The surface temperature of the panel is thus dependent on heat leakage to the underlay structure. For a well insulated floor panel, e.g. for 18 mm expanded polystyrene (PS), the temperature rise will be approximately 6 degrees for a power supply of 50 W/m², and 3 degrees for 25 W/m². If the insulation is poor, however, such as e.g. 1 mm PS, the temperature increase will be less, for example 3 degrees at 50 W/m², according to experiments.

The electrical power P has to be supplied to the heating area, i.e. to the heat providing layer. Assuming two parallel power rails, i.e. the first and second parallel longitudinal coupling elements, the current to the heating area can be tapped at different places.

A longitudinal coupling element (a power supply rail) has a resistance according to:

$$R_{rail} = \text{resistivity}_{rail} * L_{rail} * W_{rail} * h_{rail}; \quad \text{(eq. 27)}$$

which e.g. for an aluminum rail with a width, $w_{rail}$, of 1 cm, and a height of 9 micrometer, and a length of 45 cm will have a resistance of 0.14 ohm.

For a panel which is connected to the power supply at one end, i.e. both polarities P1 and P2 are connected to one end side of the panel, the effective resistance will be $2*R_{rail}$, except for the modules/sections in the far ends. However, if the power supply connections are placed on opposite sides of the panel, the effective resistance will be $R_{rail}$.

Between adjacent panels coupled together, there are electrical connections having contact resistances $R_{contact}$. As a non-limiting example, a typical contact resistance may be 0.005 ohm.

Rail resistances and contact resistances will add in series giving a power resistance:

$$R_{power} = R_{rail} + R_{contact} \quad \text{(eq. 28)}$$

It will be a voltage drop along a board due to the rail resistance $R_{rail}$, and it will be a voltage drop between boards/panels along the floor due to contact resistance $R_{contact}$. The voltage drops are proportional to the current I. Using multiple boards/panels in a row means that the voltage drop will increase as the square of the length of the row, because the current will increase proportional with the length, and the power resistance $R_{power}$ will increase proportionally with the length of the floor/row too. Hence, the heat flow $dQ/dt_{heat}$ will decrease with the power of 4. Hence the power resistances are of importance for large floors.

The power resistance $R_{power}$ is twice the size if the power supply is connected on one side of the floor/panel/row, compared if the power supply is connected on the opposite sides of the floor/panel/row. This is thus an advantage for the above described embodiment in which the first P1 and second P2 polarities are supplied to opposite ends of the panel.

As a non-limiting one panel/board example, for a 9 micrometer and 0.64 mm wide aluminum heating film, 62.5 m long acting as a heat conductor (resistance), the resistance is approximately 305 ohm. If the electrical supply is performed by the same film, but with 10 mm wide power rails/coupling elements, the power rails/coupling elements will have a resistance of approximately 0.14 ohm. With a contact resistance of 0.005 ohm, the power rail/coupling elements resistance is dominating. For a board/panel with three heating modules/sections, the heating resistances are in parallel, and the power resistances are in series. The board/panel will then have a heating resistance of 102 ohm, and a total power resistance of 0.8 ohm for same end side power supply connection. Correspondingly, the panel/board will have a 0.4 ohm total power resistance for an opposite end side connection, leading to a power drop of approximately 1% for both cases. This indicates the power supply is adequate within a board/panel, with only the film.

The present invention is not limited to the above described embodiments. Instead, the present invention relates to, and encompasses all different embodiments being included within the scope of the independent claims.

The invention claimed is:

1. A panel comprising:
    a base layer;
    a heat providing layer attached to said base layer, said heat being created by electric energy;
    a covering layer attached to said heat providing layer;
    first and second opposite longitudinal sides;
    first and second opposite end sides; and
    panel coupling means arranged for coupling said panel to adjacent panels;
    at least first and second longitudinal grooves arranged in said base layer from said first end side to said second end side and facing said heat providing layer, said at least first and second longitudinal grooves being arranged in parallel with, and having at least first and second distances to, said first and second longitudinal sides, respectively; and
    at least one first and at least one second electrical end connectors arranged in said at least first and second longitudinal grooves to protrude from at least one of said first and said second end sides, and arranged for being electrically connected to said heat providing layer, and for being at least partly resilient, thereby providing a connecting force $F_{con}$ being essentially perpendicular to said at least one of said first and said second end sides when said panel is coupled to at least one adjacent panel, and being directed towards at least one corresponding end connector of said at least one adjacent panel.

2. Panel according to claim 1, wherein said at least first and second longitudinal grooves have an end depth $D_{end}$ adjacent to at least one of said first and said second end sides being smaller than a depth $D_{mid}$ along a rest of said at least first and second longitudinal grooves; $D_{end} < D_{mid}$; said end depth $D_{end}$ corresponding to a thickness $T_{con}$ for said at least one first and at least one second electrical end connectors; $D_{end} = T_{con}$.

3. Panel according to claim 1, further comprising:
    at least first and second longitudinal coupling elements arranged in said at least first and second longitudinal grooves from said first end side to said second end side, respectively; whereby
    said at least one first and at least one second electrical end connectors are arranged for being electrically connected to said heat providing layer by means of said at least first and second longitudinal coupling elements.

4. Panel according to claim 3, wherein at least first and second surfaces of said at least first and second longitudinal coupling elements facing said heat providing layer are aligned with a surface of said base layer outside of said at least first and second longitudinal grooves and facing said heat providing layer.

5. Panel according to claim 3, wherein said at least first and second longitudinal coupling elements are of one in the group of:
    an at least partly resilient and electrically conducting material; and
    a solid and electrically conducting material.

6. Panel according to claim 5, wherein said at least first and second electrical end connectors are electrically connected to said heat providing layer via said at least first and second longitudinal coupling elements.

7. Panel according to claim 5, wherein said at least one first and at least one second electrical end connectors are electrically connected to said heat providing layer by said heat providing layer being arranged between said covering layer and said at least first and second longitudinal coupling element, and being attached to said at least first and second longitudinal coupling elements.

8. Panel according to claim 3, wherein said at least first and second longitudinal coupling elements are arranged for pressing said heat providing layer and said at least one first and at least one second electrical end connectors against each other in order to provide an electrical connection between said heat providing layer and said at least one first and at least one second electrical end connectors.

9. Panel according to claim 8, wherein said electrical connection is provided by said heat providing layer being arranged in said at least first and second longitudinal grooves between said base layer and said at least first and second longitudinal coupling elements, whereby said at least first and second longitudinal coupling elements are arranged for pressing said heat providing layer and said at least one first and at least one second electrical end connectors, respectively, against each other.

10. Heating system comprising:
    at least one panel according to claim 1; and
    an electrical energy providing arrangement, arranged adjacent to at least one of said first and said second end sides of said at least one panel for providing said electric energy to at least one first and at least one second electrical power supply end connectors of said at least one panel.

11. Heating system according to claim 10, wherein said electrical energy providing arrangement is located according to one in the group of:
    at a mounting base, whereby said at least one first and at least one second electrical power supply end connectors protrude from at least one of said first and said second end sides; and
    facing said base layer, whereby said at least one first and at least one second electrical power supply end connectors are bent around at least one of said first and said second end sides and is arranged between the base layer and the electrical energy providing arrangement, and in electrical contact with at least one part of the electrical energy providing arrangement.

12. Heating system according to claim 10, wherein said electrical energy is provided by first and second polarities P1, P2 being supplied to said first and second electrical power supply end connectors of said first end side of a panel, or to a corresponding first end side of an adjacent panel coupled directly or indirectly to said first end side of said panel.

13. Heating system according to claim 10, wherein said electrical energy is provided by:
    a first polarity P1 being supplied to said first or second electrical power supply end connectors of said first end side of a panel, or to a corresponding first end side of an adjacent panel coupled directly or indirectly to said first end side of said panel; and
    a second polarity P2 being supplied to said first or second electrical power supply end connectors of said second end side of said panel, or to a corresponding second end side of an adjacent panel coupled directly or indirectly to said second end side of said panel.

14. Method for installing said heating system claimed in claim 10, comprising:
    mounting said electrical energy providing arrangement at said mounting base;
    mechanically coupling a first panel with at least one second panel by use of said coupling means on said first and second end sides, thereby creating a row of said first panel and said at least one second panel;
    electrically connecting said first panel and said at least one second panel by use of said first and second end connectors of said first panel and said at least one second panel; and
    connecting first and second electrical power supply end connectors of one or more of said first panel and said at least one second panel to said electrical energy providing arrangement.

15. Method for installing a heating system as claimed in claim 10, including:
    mounting said electrical energy providing arrangement at said mounting base;
    mechanically coupling a first panel with at least one second panel by use of said coupling means on said first and second end sides, thereby creating a row of said first panel and said at least one second panel;
    electrically connecting said first panel and said at least one second panel by use of said first and second end connectors of said first panel and said at least one second panel; and
    connecting one of said first and second electrical power supply end connectors on said first end side of said first panel to said electrical energy providing arrangement, thereby being provided with said first polarity P1 of the electrical energy;
    connecting another one of said first and second electrical power supply end connectors on said second end side of said first panel to said electrical energy providing arrangement, thereby being provided with said second polarity P2 of the electrical energy.

* * * * *